United States Patent
Papasakellariou et al.

(10) Patent No.: US 9,510,327 B2
(45) Date of Patent: Nov. 29, 2016

(54) AGGREGATION OF FDD AND TDD CELLS

(71) Applicant: Samsung Electronics Co., Ltd., Suwon-si, Gyeonggi-do (KR)

(72) Inventors: Aris Papasakellariou, Houston, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 14/222,026

(22) Filed: Mar. 21, 2014

(65) Prior Publication Data

US 2014/0293893 A1   Oct. 2, 2014

Related U.S. Application Data

(60) Provisional application No. 61/806,277, filed on Mar. 28, 2013, provisional application No. 61/874,847, filed on Sep. 6, 2013, provisional application No. 61/874,858, filed on Sep. 6, 2013, provisional application No. 61/843,755, filed on Jul. 8, 2013.

(51) Int. Cl.
| | |
|---|---|
| *H04B 7/14* | (2006.01) |
| *H04W 72/04* | (2009.01) |
| *H04L 5/00* | (2006.01) |
| *H04L 5/14* | (2006.01) |

(52) U.S. Cl.
CPC ............ *H04W 72/04* (2013.01); *H04L 5/001* (2013.01); *H04L 5/0055* (2013.01); *H04L 5/1469* (2013.01); *H04W 72/0406* (2013.01); *H04W 72/0446* (2013.01)

(58) Field of Classification Search
CPC .............. H04W 16/24; H04W 72/04; H04W 72/1263; H04W 72/1268; H04W 72/1273
USPC ................. 370/279–282, 310, 328, 329, 330
See application file for complete search history.

(56) References Cited

U.S. PATENT DOCUMENTS

| | | | | |
|---|---|---|---|---|
| 2013/0322343 | A1* | 12/2013 | Seo et al. ....................... | 370/328 |
| 2014/0029484 | A1* | 1/2014 | Choi et al. ...................... | 370/280 |
| 2014/0078941 | A1* | 3/2014 | Seo et al. ....................... | 370/280 |
| 2014/0362796 | A1* | 12/2014 | Seo ........................ | H04L 1/1854 370/329 |
| 2015/0055521 | A1* | 2/2015 | Seo et al. ....................... | 370/280 |
| 2015/0078221 | A1* | 3/2015 | Seo et al. ....................... | 370/280 |

FOREIGN PATENT DOCUMENTS

| | | |
|---|---|---|
| WO | WO 2012/108720 A2 | 8/2012 |
| WO | WO 2012/139291 A1 | 10/2012 |

OTHER PUBLICATIONS

International Search Report dated Jul. 9, 2014 in connection with International Patent Application No. PCT/KR2014/002672, 3 pages.
3GPP TSG RAN WG1 #72; "CRS interference in UL/DL flexible subframes"; R1-130289; St. Julian's, Malta; Jan. 28-Feb. 1, 2013; 3 pages.

(Continued)

*Primary Examiner* — Dmitry H Levitan

(57) ABSTRACT

Methods and apparatus of a base station or a User Equipment (UE) in communication with each other are provided. The UE is configured by the base station for simultaneous communication with at least a cell using Frequency Division Duplexing (FDD) and at least a cell using Time Division Duplexing (TDD). Processes enabling transmission of control information associated with scheduling data reception or data transmission from the UE are provided.

21 Claims, 11 Drawing Sheets

(56) References Cited

OTHER PUBLICATIONS

3GPP TSG RAN WG1 Meeting #70bis; "Maximum number of DL HARQ processes for TDD inter-band CA with different TDD UL_DL configurations"; R1-124478; San Diego, CA; Oct. 8-12, 2012; 7 pages.

3GPP TSG RAN WG1 Meeting #70bis; "DL HARQ Process Number for CC Specific TDD Configuration"; R1-124389; San Diego, CA; Oct. 8-12, 2012; 5 pages.

* cited by examiner

| TTI#0 | TTI#1 | TTI#2 | TTI#3 | TTI#4 | TTI#5 | TTI#6 | TTI#7 | TTI#8 | TTI#9 |
|---|---|---|---|---|---|---|---|---|---|
| D | S | D | D | D | D | D | D | D | D |

AGGREGATION OF FDD AND TDD CELLS

CROSS-REFERENCE TO RELATED APPLICATION AND CLAIM OF PRIORITY

The present application claims priority under 35 U.S.C. §119(e) to U.S. Provisional Patent Application Ser. No. 61/806,277 filed Mar. 28, 2013, entitled "Aggregation of FDD and TDD Carriers," U.S. Provisional Patent Application Ser. No. 61/843,755 filed Jul. 9, 2013, entitled "Aggregation of an FDD Carrier with a TDD Primary Carrier," U.S. Provisional Patent Application Ser. No. 61/874,847 filed Sep. 6, 2013, entitled "Aggregation of an FDD Carrier with a TDD Primary Carrier," and U.S. Provisional Patent Application Ser. No. 61/874,858 filed Sep. 6, 2013, entitled "Aggregation of FDD and TDD Carriers." The above-identified provisional patent applications are hereby incorporated by reference in their entirety.

TECHNICAL FIELD

The present application relates generally to wireless communications and, more specifically, to an aggregation of a cell using Frequency Division Duplexing (FDD) and of a cell using Time Division Duplexing (TDD).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

This disclosure provides a system and method for transmitting control information associated with scheduling data in communication systems with aggregation of one or more TDD cells with one or more FDD cells.

In a first embodiment, a method is provided. The method includes transmitting, by a base station to a User Equipment (UE) communicating with the base station through a Primary Cell (PCell) using either Frequency Division Duplexing (FDD) or Time Division Duplexing (TDD), configuration information for communication with a Secondary Cell (SCell). If the PCell uses FDD the SCell uses TDD, and if the PCell uses TDD the SCell uses FDD. The method also includes transmitting, by the base station to the UE, signaling indicating a TDD UpLink-DownLink (UL-DL) configuration for the cell using TDD. A TDD UL-DL configuration is defined over a time period of ten Transmission Time Intervals (TTIs) that comprise DL TTIs where a communication direction is from the base station to the UE, UL TTIs where a communication direction is from the UE to the base station, and special TTIs where a communication direction can be both from the base station to the UE and from the UE to the base station. Each TTI of the ten TTIs has a unique time domain index. The method further includes transmitting, by the base station to the UE, one or more Physical DL Control CHannels (PDCCHs) conveying respective one or more DCI formats. Each of the one or more DCI formats schedules to the UE a Physical DL Shared CHannel (PDSCH) transmission or a Semi-Persistently Scheduled (SPS) PDSCH release in the PCell or a PDSCH transmission in the SCell. The method also includes in response to receiving the configuration information, the signaling and at least one DCI format from the one or more DCI formats, determining, by the UE, an UL TTI in the PCell for transmission of acknowledgement information. If the PCell uses FDD, the acknowledgement information is in response to one reception of PDSCH or SPS PDSCH release in the PCell or in response to one reception of PDSCH in the SCell, in only one TTI, and if the only one TTI is not an UL TTI in the SCell, the acknowledgement information is in response to a reception of a PDSCH or SPS PDSCH release in the PCell and in a response to a reception of a PDSCH in the SCell, including no reception in either the PCell or in the SCell, while if the only one TTI is an UL TTI in the SCell, the acknowledgement information is in response only to a reception of a PDSCH or SPS PDSCH release in the PCell. If the PCell uses TDD, the acknowledgement information is in response to at least one reception of a PDSCH or SPS PDSCH release in one of $M_{TDD}$ TTIs in the PCell or of a PDSCH in one of $M_{FDD}$ TTIs in the SCell. $M_{TDD}$ or $M_{FDD}$ is a number of TTIs in the PCell or the SCell, respectively, for which acknowledgement information is transmitted in the UL TTI and $M_{TDD}$ is smaller than or equal to $M_{FDD}$.

In a second embodiment, a method is provided. The method includes receiving, from a base station, by a User Equipment (UE) communicating with the base station through a Primary Cell (PCell) using a Time Division Duplexing (TDD) UpLink-DownLink (UL-DL) configuration, configuration information for communication with a Secondary Cell (SCell) using Frequency Division Duplexing (FDD). The method also includes transmitting, by the base station to the UE, one or more Physical DL Control CHannel (PDCCH) conveying a respective one or more DCI formats scheduling to the UE respective transmissions of one or more Physical DL Shared CHannels (PDSCHs) or a Semi-Persistently Scheduled (SPS) PDSCH release. Each of the one or more DCI formats includes a DL Hybrid Acknowledgement Repeat reQuest (HARQ) field comprising of 4 binary elements indicating a DL HARQ process number. If the PCell uses TDD UL-DL configuration 5 from Table 1, a DL HARQ process for the SCell is restricted to be one of 16 DL HARQ processes, from a maximum of 17 DL HARQ processes. The method also includes a detecting, by the UE, at least one of the one or more DCI formats. The method further includes receiving, by the UE, a respective at least one PDSCH or SPS PDSCH release.

In a third embodiment, a base station configured to communicate with a User Equipment (UE) through a Primary Cell (PCell) using either Frequency Division Duplexing (FDD) or Time Division Duplexing (TDD) is provided. The base station includes a transmitter configured to transmit, to the UE, configuration information for communication with a Secondary Cell (SCell). If the PCell uses FDD the SCell uses TDD, and if the PCell uses TDD the SCell uses FDD. The base station also includes a transmitter configured to transmit, to the UE, signaling indicating a TDD UpLink-DownLink (UL-DL) configuration for the cell using TDD. A TDD UL-DL configuration is defined over a time period of ten Transmission Time Intervals (TTIs) that comprise DL TTIs where a communication direction is from the base station to the UE, UL TTIs where a communication direction is from the UE to the base station, and special TTIs where a communication direction can be both from the base station to the UE and from the UE to the base station. Each TTI of the ten TTIs has a unique time domain index. The base station further includes a transmitter configured to transmit, to the UE, one or more Physical DL Control CHannels (PDCCHs) conveying respective one or more DCI formats. Each of the one or more DCI formats schedules to the UE a Physical DL Shared CHannel (PDSCH) transmission or a Semi-Persistently Scheduled (SPS) PDSCH release in the PCell or a PDSCH transmission in the SCell. The base station also includes a processor configured to determine an UL TTI for a reception of acknowledgement information from the UE. The base station further includes a receiver configured to receive, from the UE, acknowledgement information in the UL TTI in the PCell. If the PCell uses FDD, the acknowledgement information is in response to one reception of PDSCH or SPS PDSCH release in the PCell or in response to one reception of PDSCH in the SCell, in only one TTI, and if the only one is not an UL TTI in the SCell, the acknowledgement information is in response to a reception of a PDSCH or SPS PDSCH release in the PCell and in a response to a reception of a PDSCH in the SCell, including no reception in either the PCell or in the SCell, while if the only one TTI is an UL TTI in the SCell, the acknowledgement information is in response only to a reception of a PDSCH or SPS PDSCH release in the PCell. If the PCell uses TDD, the acknowledgement information is in response to at least one reception of a PDSCH or SPS PDSCH release in one of $M_{TDD}$ TTIs in the PCell or of a PDSCH in one of $M_{FDD}$ TTIs in the SCell. $M_{TDD}$ or $M_{FDD}$ is a number of TTIs in the PCell or the SCell, respectively, for which acknowledgement information is transmitted in the UL TTI and $M_{TDD}$ is smaller than or equal to $M_{FDD}$.

In a fourth embodiment, a User Equipment (UE) configured to communicate with a base station through a Primary Cell (PCell) using either Frequency Division Duplexing (FDD) or Time Division Duplexing (TDD) is provided. The UE includes a receiver configured to receive, from the base station, configuration information for communication with a Secondary Cell (SCell). If the PCell uses FDD the SCell uses TDD, and if the PCell uses TDD the SCell uses FDD. The UE also includes a receiver configured to receive, from the base station, signaling indicating a TDD UpLink-DownLink (UL-DL) configuration for the cell using TDD. A TDD UL-DL configuration is defined over a time period of ten Transmission Time Intervals (TTIs) that comprise DL TTIs where a communication direction is from the base station to the UE, UL TTIs where a communication direction is from the UE to the base station, and special TTIs where a communication direction can be both from the base station to the UE and from the UE to the base station. Each TTI of the ten TTIs has a unique time domain index. The UE further includes a receiver configured to receive, from the base station, one or more Physical DL Control CHannels (PDCCHs) conveying respective one or more DCI formats. Each of the one or more DCI formats schedules a Physical DL Shared CHannel (PDSCH) reception or a Semi-Persistently Scheduled (SPS) PDSCH release in the PCell or a PDSCH reception in the SCell. The UE also includes a processor configured to determine an UL TTI for a transmission of acknowledgement information to the base station. The UE further includes a transmitter, configured to transmit to the base station, in response to the reception of the configuration information, the signaling, and the one or more DCI formats, acknowledgement information. If the PCell uses FDD, the acknowledgement information is in response to one reception of PDSCH or SPS PDSCH release in the PCell or in response to one reception of PDSCH in the SCell, in only one TTI, and if the only one TTI is not an UL TTI in the SCell, the acknowledgement information is in response to a reception of a PDSCH or SPS PDSCH release in the PCell and in a response to a reception of a PDSCH in the SCell, including no reception in either the PCell or in the SCell, while if the only one TTI is an UL TTI in the SCell, the acknowledgement information is in response only to a reception of a PDSCH or SPS PDSCH release in the PCell. If the PCell uses TDD, the acknowledgement information is in response to at least one reception of a PDSCH or SPS PDSCH release in one of $M_{TDD}$ TTIs in the PCell or of a PDSCH in one of $M_{FDD}$ TTIs in the PCell. $M_{TDD}$ or $M_{FDD}$ is a number of TTIs in the PCell or the SCell, respectively, for which acknowledgement information is transmitted in the UL TTI and $M_{TDD}$ is smaller than or equal to $M_{FDD}$.

In a fifth embodiment, a base station configured to communicate with a User Equipment (UE) through a Primary Cell (PCell) using a Time Division Duplexing (TDD) UpLink-DownLink (UL-DL) configuration is provided. The base station includes a transmitter configured to transmit, to the UE, configuration information for communication with a Secondary Cell (SCell) using Frequency Division Duplexing (FDD). The base station also includes a transmitter configured to transmit, to the UE, one or more Physical DL Control CHannel (PDCCH) conveying a respective one or more DCI formats scheduling to the UE respective transmissions of one or more Physical DL Shared CHannels (PDSCHs) or a Semi-Persistently Scheduled (SPS) PDSCH release. Each of the one or more DCI formats includes a DL Hybrid Acknowledgement Repeat reQuest (HARQ) field comprising of 4 binary elements indicating a DL HARQ process number. If the PCell uses TDD UL-DL configuration 5 from Table 1, a DL HARQ process for the SCell is restricted to be one of 16 DL HARQ processes, from a maximum of 17 DL HARQ processes.

In a sixth embodiment, a User Equipment (UE) configured to communicate with a base station through a Primary Cell (PCell) using a Time Division Duplexing (TDD) UpLink-DownLink (UL-DL) configuration is provided. The UE includes a receiver configured to receive, from the base station, configuration information for communication with a Secondary Cell (SCell) using Frequency Division Duplexing (FDD). The UE also includes a receiver configured to receive, from the base station, one or more Physical DL Control CHannel (PDCCH) conveying a respective one or more DCI formats scheduling respective receptions of one or more Physical DL Shared CHannels (PDSCHs) or a Semi-Persistently Scheduled (SPS) PDSCH release. Each of the one or more DCI formats includes a DL Hybrid Acknowledgement Repeat reQuest (HARQ) field comprising of 4 binary elements indicating a DL HARQ process number. If the PCell uses TDD UL-DL configuration 5 from Table 1, a DL HARQ process for the SCell is restricted to be one of 16 DL HARQ processes, from a maximum of 17 DL HARQ processes.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 24 illustrates an example TDD UL-DL configuration with DL TTIs, one special and no UL TTIs according to this disclosure.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.1.0, "E-UTRA, Physical channels and modulation" (REF 1); 3GPP TS 36.212 v11.1.0, "E-UTRA, Multiplexing and Channel coding" (REF 2); 3GPP TS 36.213 v11.1.0, "E-UTRA, Physical Layer Procedures" (REF 3); and 3GPP TS 36.331 v11.1.0, "E-UTRA, Radio Resource Control (RRC) Protocol Specification." (REF 4).

This disclosure relates to the aggregation of cells using Frequency Division Duplexing (FDD) and Time Division Duplexing (TDD) in wireless communication networks. A wireless communication network includes a DownLink (DL) that conveys signals from transmission points (such as base stations or eNodeBs) to user equipments (UEs). The wireless communication network also includes an UpLink (UL) that conveys signals from UEs to reception points such as eNodeBs.

Figure 1:
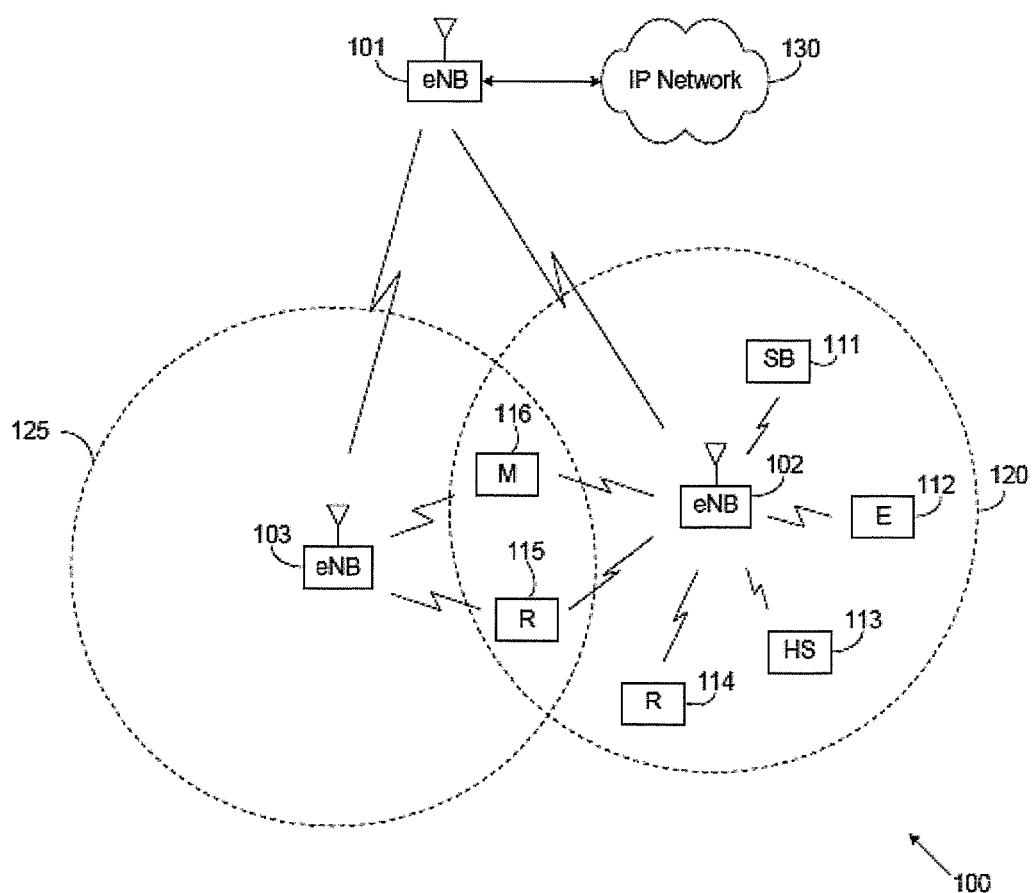
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support aggregation of FDD cells and TDD cells by the network 100.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
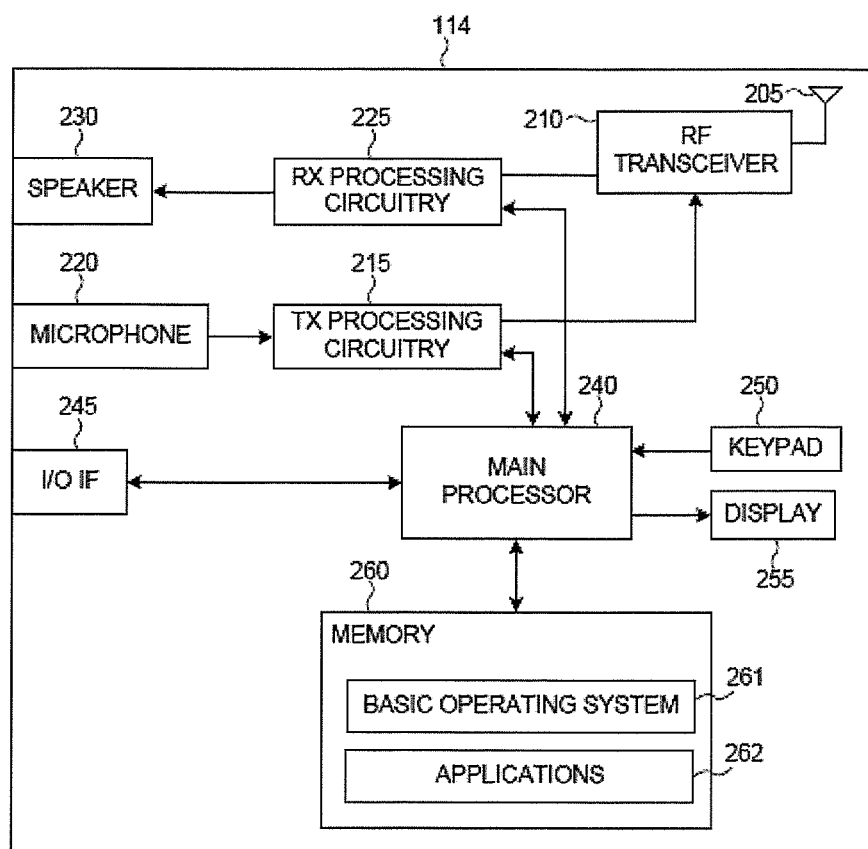
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260 such as operations in support of communication with aggregation of FDD cells and TDD cells. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touchscreen.

The memory 260 is coupled to the main processor 240. Part of the memory 260 could include a random access memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support communication with aggregation of FDD cells and TDD cells.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smartphone, UEs could be configured to operate as other types of mobile or stationary devices. In addition, various components in FIG. 2 could be replicated, such as when different RF components are used to communicate with the eNBs 101-103 and with other UEs.

Figure 3:
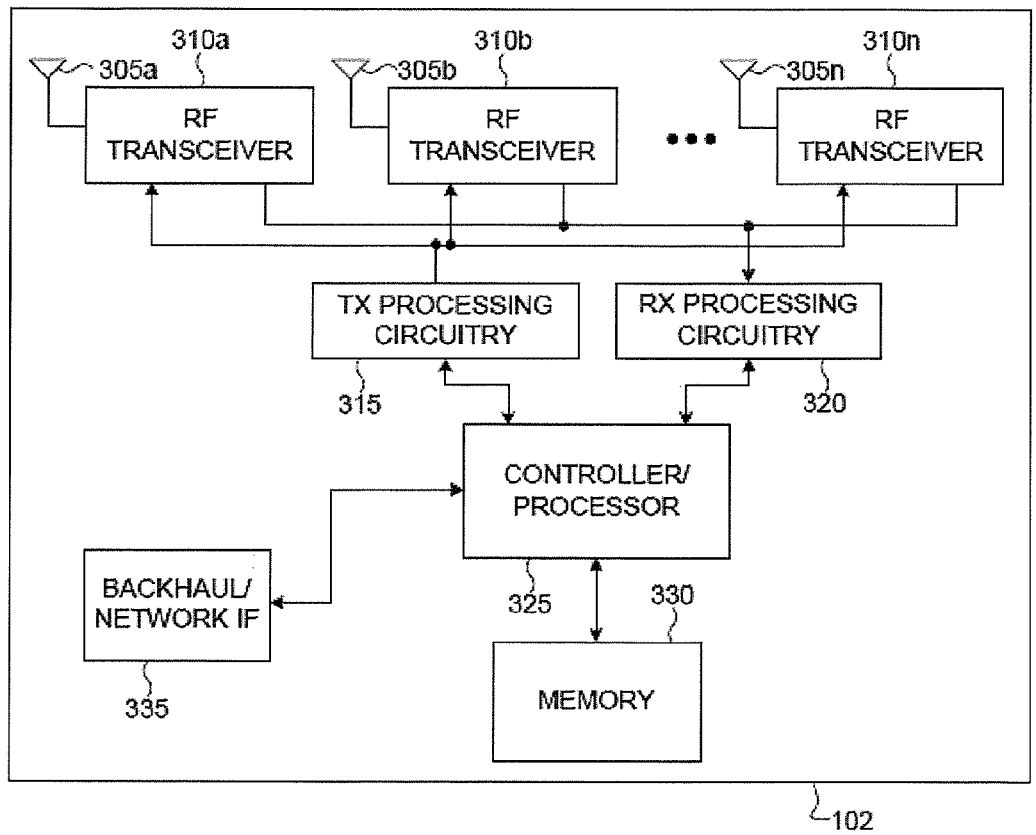
FIG. 3 illustrates an example eNodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LIE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support communication with aggregation of FDD cells and TDD cells.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. An eNB, such as eNB 102, can transmit data information or DCI through respective Physical DL Shared CHannels (PDSCHs) or Physical DL Control CHannels (PDCCHs). The eNB 102 also transmits a PDCCH over a number of Control Channel Elements (CCEs). Enhanced PDCCHs (EPDCCHs) can also be used (see also REF 3) and, for brevity, in the following the term "PDCCH" can refer to either a PDCCH or an EPDCCH unless it is explicitly mentioned otherwise.

An eNB, such as eNB 102, can transmit one or more of multiple types of RS, including a UE-Common RS (CRS), a Channel State Information RS (CSI-RS), and a DeModulation RS (DMRS). A CRS can be transmitted over a DL system BandWidth (BW) and can be used by UEs, such as UE 114, to demodulate data or control signals or to perform measurements. To reduce CRS overhead, eNB 102 can transmit a CSI-RS with a smaller density in the time or frequency domain than a CRS. For channel measurement, Non-Zero Power CSI-RS (NZP CSI-RS) resources can be used. For interference measurement, UE 114 can use CSI Interference Measurement (CSI-IM) resources associated with a Zero Power CSI-RS (ZP CSI-RS) that is configured to UE 114 by a serving eNB 102 using higher layer signaling (see also REF 3). Finally, DMRS is transmitted only in the BW of a respective PDSCH or PDCCH, and UE 114 can use the DMRS to demodulate information in a PDSCH or PDCCH.

Figure 4:
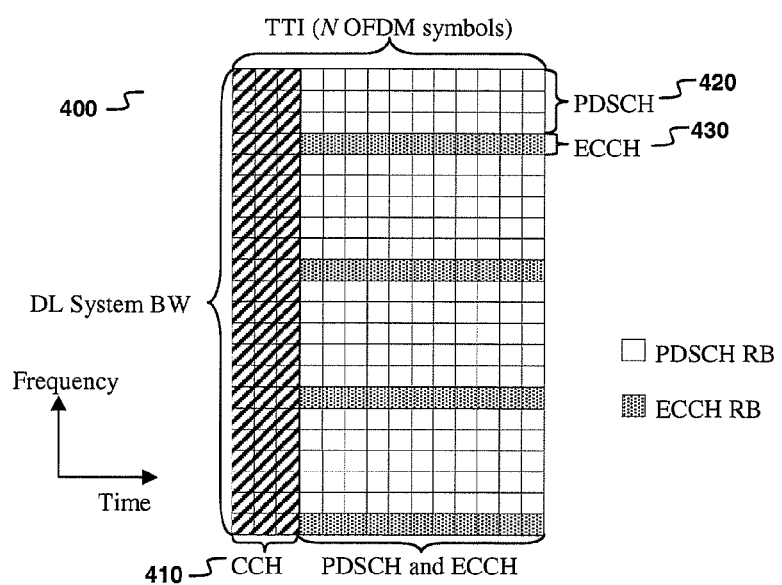
FIG. 4 illustrates an example structure of a DL Transmission Time Interval (TTI) according to this disclosure.

FIG. 4 illustrates an example structure of a DL Transmission Time Interval (TTI) according to this disclosure. The embodiment of the DL TTI structure 400 shown in FIG. 4 is for illustration only. Other embodiments could be used without departing from the scope of this disclosure.

As shown in FIG. 4, DL signaling, such as from the eNB 102, uses Orthogonal Frequency Division Multiplexing (OFDM) and a DL TTI includes N=14 OFDM symbols in the time domain and K Resource Blocks (RBs) in the frequency domain. One TTI is equivalent to one SubFrame (SF). A first type of Control CHannels (CCHs) is transmitted by the eNB 102 to a UE, such as the UE 114, in a first $N_1$ OFDM symbols 410 (including no transmission, $N_1=0$). A remaining $N-N_1$ OFDM symbols are used primarily for transmitting PDSCHs 420 and, in some RBs of a TTI, for transmitting a second type of Enhanced CCHs (ECCHs) 430.

In some wireless networks, UL signals, such as from the UE 114, can include data signals conveying information content, control signals conveying UL Control Information (UCI), and RS.

UE 114 can transmit data information or UCI through a respective Physical UL Shared CHannel (PUSCH) or a Physical UL Control CHannel (PUCCH). If UE 114 simultaneously transmits data information and UCI, UE 114 can multiplex both in a PUSCH. The UCI can include Hybrid Automatic Repeat reQuest ACKnowledgement (HARQ-ACK) information indicating correct or incorrect detection of data Transport Blocks (TBs) in a PDSCH, Scheduling Request (SR) information indicating whether UE 116 has data in its buffer, and Channel State Information (CSI) enabling eNB 102 to select appropriate parameters for PDSCH transmissions to UE 114. HARQ-ACK information can include a positive ACKnowledgement (ACK) in response to a correct PDCCH or data TB detection, a Negative ACKnowledgement (NACK) in response to an incorrect data TB detection, and an absence of a PDCCH detection (DTX) that can be implicit or explicit. A DTX could be implicit if UE 114 does not transmit a HARQ-ACK signal. A DTX can be explicit if UE 114 can identify missed PDCCHs in other ways (it is also possible to represent NACK and DTX with the same NACK/DTX state).

The CSI can include a Channel Quality Indicator (CQI) informing eNB 102 of Transport Block Size (TBS) that can be received by the UE with a predefined target BLock Error Rate (BLER), a Precoding Matrix Indicator (PMI) informing eNB 102 how to combine signals from multiple transmitted antennas in accordance with a Multiple Input Multiple Output (MIMO) transmission principle, and a Rank Indicator (RI) indicating a transmission rank for a PDSCH. For example, UE 114 can determine a CQI from a Signal-to-Noise and Interference (SINR) measurement while also considering a configured PDSCH Transmission Mode (TM) and the UE's receiver characteristics. Therefore, a CQI report from UE 114 can provide a serving eNB 102 an estimate of the SINR conditions experienced by DL signal transmissions to UE 114.

The UL RS can include DMRS and Sounding RS (SRS). DMRS can be transmitted only in a BW of a respective PUSCH or PUCCH, and eNB 102 can use a DMRS to demodulate information in a PUSCH or PUCCH. SRS can be transmitted by UE 114 in order to provide eNB 102 with a UL CSI. SRS transmission from UE 114 can be periodic (P-SRS or type 0 SRS) at predetermined Transmission Time Intervals (TTIs) with transmission parameters configured to UE 114 by higher-layer signaling, such as Radio Resource Control (RRC) signaling (see also REF 4). SRS transmission from UE 114 can also be aperiodic (A-SRS, or type 1 SRS) as triggered by a SRS request field included in a DCI format conveyed by a PDCCH scheduling PUSCH or PDSCH and indicating A-SRS transmission parameters from a set of A-SRS transmission parameters that were previously configured to UE 114 by a serving eNB 102 (see also REF 2 and REF 3). For initial access or for subsequent synchronization purposes, UE 114 can also be configured by eNB 102 to transmit a Physical Random Access CHannel (PRACH—see also REF 1 and REF 3).

Figure 5:
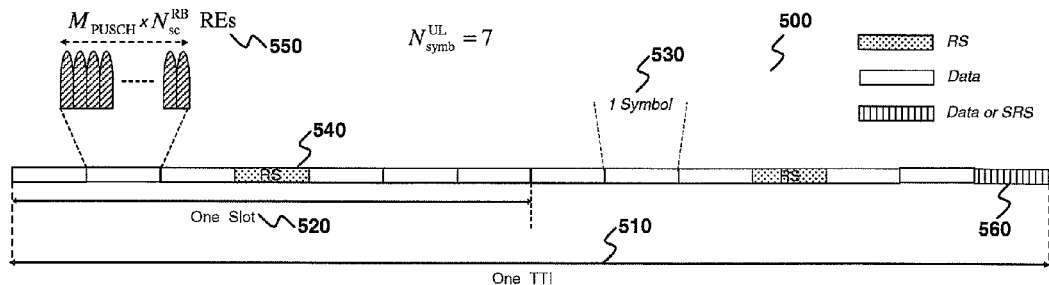
FIG. 5 illustrates an example PUSCH transmission structure over a Transmission Time Interval (TTI) according to this disclosure.

FIG. 5 illustrates an example PUSCH transmission structure over a TTI according to this disclosure. The embodiment of the PUSCH transmission structure 500 over a TTI shown in FIG. 5 is for illustration only. Other embodiments could be used without departing from the scope of this disclosure.

As shown in FIG. 5, a TTI is one subframe 450 that includes two slots. Each slot 520 includes $N_{symb}^{UL}$ symbols 530 for transmitting data information, UCI, or RS. Some PUSCH symbols in each slot are used for transmitting DMRS 540. A transmission BW includes frequency resource units that are referred to as Resource Blocks (RBs). Each RB includes $N_{sc}^{RB}$ sub-carriers, or Resource Elements (REs), and UE 114 is allocated $M_{PUSCH}$ RBs 550 for a total of $M_{sc}^{PUSCH} = M_{PUSCH} \cdot N_{sc}^{RB}$ REs for a PUSCH transmission BW. The last TTI symbol may be used to multiplex SRS transmissions 560 from one or more UEs. A number of TTI symbols available for data/UCI/DMRS transmission is $N_{symb}^{PUSCH} = 2 \cdot (N_{symb}^{UL} - 1) - N_{SRS}$, where $N_{SRS} = 1$ if a last TTI symbol is used to transmit SRS and $N_{SRS} = 0$ otherwise.

Figure 6:
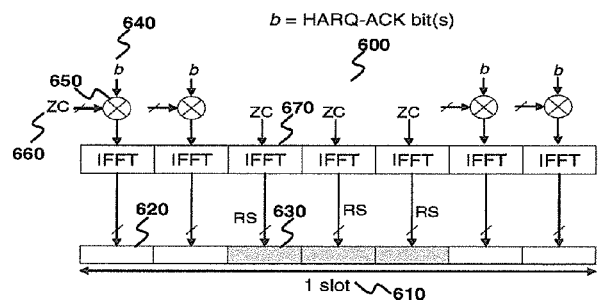
FIG. 6 illustrates an example first PUCCH format structure for HARQ-ACK transmission in one slot of a Transmission Time Interval (TTI) according to this disclosure.

FIG. 6 illustrates an example first PUCCH format structure for HARQ-ACK transmission in one slot of a TTI according to this disclosure. The example of the PUCCH format structure 600 shown in FIG. 6 is for illustration only. Other embodiments could be used without departing from the scope of this disclosure.

As shown in FIG. 6, a TTI includes two slots and each slot 610 includes $N_{symb}^{UL}$ symbols for transmitting HARQ-ACK signals 620 or RS 630 in a RB. HARQ-ACK bits b 640 modulate 650 a Zadoff-Chu (ZC) sequence 660 of length $N_{sc}^{RB}$ using Binary Phase Shift Keying (BPSK) or Quaternary Phase Shift Keying (QPSK) modulation. An HARQ-ACK bit can have a numeric value of −1 if it conveys a positive ACKnowledgement (ACK) for a correct detection of a data TB and a numeric value of 1 if it conveys a Negative ACKnowledgement (NACK) for a correct detection of a data TB. A modulated ZC sequence is transmitted after performing an Inverse Fast Frequency Transform (IFFT) 670. An RS is transmitted through an unmodulated ZC sequence.

A first PUCCH format with structure, such as the PUCCH format structure 600b, is capable of supporting transmission of only one or two HARQ-ACK bits. When multiple PUCCH resources exist for the UE 114 to select for HARQ-ACK signal transmission, a combination of PUCCH resource selection and a use of a first PUCCH format structure 600 can support transmissions of up to four HARQ-ACK bits (see also REF 3). In certain embodiments, a second PUCCH format also can be used to transmit a large number of HARQ-ACK bits such as, for example, up to 22 bits.

Figure 7:
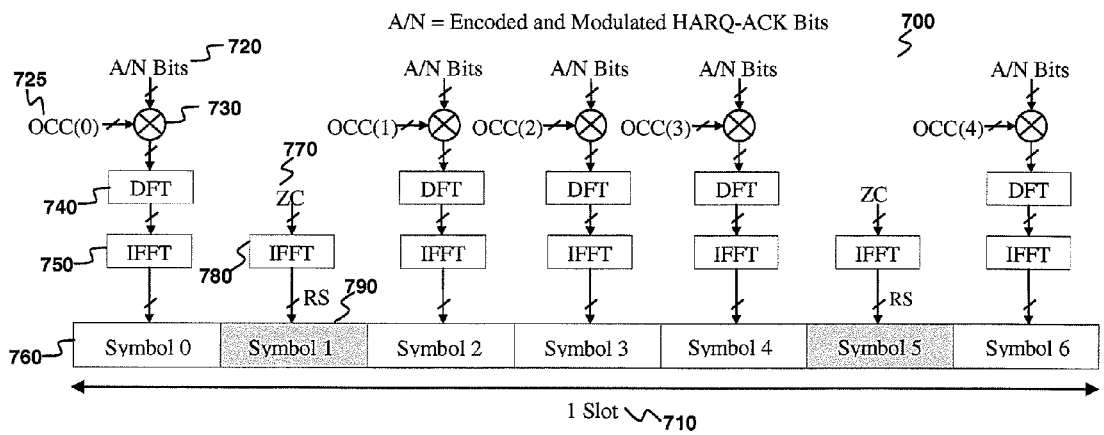
FIG. 7 illustrates an example second PUCCH format structure in one slot of a Transmission Time Interval (TTI) according to this disclosure.

FIG. 7 illustrates an example second PUCCH format structure for HARQ-ACK transmission in one slot of a TTI according to this disclosure. The embodiment of the transmitter 700 shown in FIG. 7 is for illustration only. Other embodiments could be used without departing from the scope of this disclosure.

As shown in FIG. 7, a TTI includes two slots and each slot 710 includes $N_{symb}^{UL}$ symbols for transmitting HARQ-ACK signals or RS in a RB. HARQ-ACK signal transmission uses DFT-S-OFDM. After encoding and modulation, using respectively a block code and QPSK, a set of same HARQ-ACK bits 720 is multiplied 730 with elements of an Orthogonal Covering Code (OCC) 725 and is subsequently DFT precoded 740. For example, for 5 DFT-S-OFDM symbols per slot for HARQ-ACK signal transmission, an OCC of length 5 is used. An output is passed through an IFFT 750 and it is then mapped to a DFT-S-OFDM symbol 760. As the operations are linear, their relative order may be inter-changed. Same or different HARQ-ACK bits may be transmitted in a second slot of a TTI. RS is also transmitted in each slot to enable coherent demodulation of HARQ-ACK signals. A RS is constructed from a ZC sequence of length $N_{sc}^{RB}$ 770 which is passed through an IFFT 780 and mapped to another DFT-S-OFDM symbol 790.

A PDSCH transmission to the UE 114 or a PUSCH transmission from the UE 114 can be either dynamically scheduled or Semi-Persistently Scheduled (SPS). Dynamic transmissions are triggered by a DCI format that is conveyed by a PDCCH and includes fields providing PDSCH or PUSCH transmission parameters while SPS transmission parameters are configured to the UE 114 from the eNB 102 through higher layer signaling, such as Radio Resource Control (RRC) signaling. A DCI format scheduling a PDSCH transmission is referred to as DL DCI format while a DCI format scheduling a PUSCH transmission is referred to as UL DCI format.

In a TDD communication system, a communication direction in some TTIs is in the DL, and a communication direction in some other TTIs is in the UL. Table 1 lists indicative UL-DL configurations over a period of 10 TTIs (a TTI has a duration of 1 millisecond (msec)), which is also referred to as frame period. "D" denotes a DL TTI, "U" denotes a UL TTI, and "S" denotes a special TTI that includes a DL transmission field referred to as DwPTS, a Guard Period (GP), and a UL transmission field referred to as UpPTS. Several combinations exist for a duration of each field in a special TTI subject to the condition that the total duration is one TTI.

TABLE 1

| TDD UL-DL configurations | | | | | | | | | | | |
|---|---|---|---|---|---|---|---|---|---|---|---|
| TDD UL-DL Configu- ration | DL-to-UL Switch- point periodicity | TTI number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In a TDD system, a HARQ-ACK signal transmission from the UE 114 in response to PDSCH receptions in multiple DL TTIs can be transmitted in a same UL TTI. A number M of DL TTIs for which a HARQ-ACK signal transmission for associated receptions of PDSCHs or SPS PDSCH release from the UE 114 is referred to as a bundling window of size M. One consequence of TDD operation is that a HARQ-ACK signal transmission from the UE 114 or the eNB 102 in response to a data Transport Block (TB) reception may not occur as early as for FDD where both DL signaling and UL signaling can be supported in a same TTI using different frequencies. Table 2 indicates DL TTIs n−k, where k∈K, for which an HARQ-ACK signal transmission is in UL TTI n (see also REF 3). For example, for TDD operation and UL-DL configuration 5, a HARQ-ACK signal transmission from the UE 114 in response to a data TB reception in TTI number 9 occurs after 13 TTIs while for FDD operation a HARQ-ACK signal transmission from the UE 114 in response to a data TB reception in a TTI always occurs after 4 TTIs. From Table 2, it is observed that a bundling window size can depend on the UL TTI in which the HARQ-ACK signal transmission occurs and, for TDD UL-DL configuration 0, a bundling window size can be equal to zero (such as for TTI#3 and TTI#8).

field can include, for example, 2 bits and can be used to offset a PUCCH resource determined by the UE 114 for a respective DL TTI (see also REF 3) in order to compress

TABLE 2

Downlink association set index K: $\{k_0, k_1, \ldots k_{M-1}\}$

| TDD UL-DL Configuration | TTI #n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

To accommodate an additional HARQ latency for a TDD system, a maximum number of HARQ processes needs to be larger than for a FDD system. For DL operation and for TDD UL-DL configurations 2, 3, 4, and 5, a number of HARQ processes larger than 8 is needed and a respective DL HARQ process number field in respective DCI formats includes 4 bits while it includes 3 bits for a FDD system where a maximum number of DL HARQ processes is 8.

DL DCI formats also include a DL Assignment Index (DAI) field of 2 bits. A DAI in a DL DCI format is a counter indicating a number for a DL DCI format the eNB 102 transmits to the UE 114 in a DL TTI of a bundling window (see also REF 2 and REF 3). Using the value of a DAI field, the UE 114 can determine whether the UE 114 missed any detections of DCI formats in previous DL TTIs and can incorporate such events in a HARQ-ACK signal transmission for a respective bundling window (see also REF 3). Additionally, UL DCI formats include a DAI field informing the UE 114 of a total number of DL DCI formats (PDSCHs or a SPS PDSCH release) transmitted to the UE 114 in respective TTIs of an associated bundling window (see also REF 2 and REF 3). Using a value of a DAI field in an UL DCI format, the UE 114 provides HARQ-ACK information in a respective PUSCH for a number of DCI formats in a respective bundling window according to a configured TM for PDSCH receptions. For example, depending on certain conditions (see also REF 3), an UL DCI format can include a DAI field of 2 bits with the values of '00', '01', '10', and '11' mapped to numeric values $W_{DAI}^{UL}$ indicating transmission in the PUSCH of HARQ-ACK information corresponding to 1, 2, 3, and 0 or 4 DL DCI formats scheduling respective transmissions of PDSCH or SPS PDSCH release (the UE 114 selects 4 if the UE 114 detects at least one DL DCI format scheduling a PDSCH or SPS PDSCH release; otherwise, the UE 114 selects 0—see also REF 3). Moreover, at least for TDD UL-DL configuration 0 that includes more UL TTIs than DL TTIs, an UL DCI format includes an UL index field indicating whether a PUSCH scheduling applies for a first UL TTI, a second UL TTI, or both a first and a second UL TTIs (see also REF 2).

Additionally, as indicated in Table 2 for a TDD cell, HARQ-ACK transmissions from UEs for M>1 DL TTIs can be in a same UL TTI. To avoid a respective PUCCH resource expansion, as a PUCCH resource may need to be separately determined for each of the M>1 DL TTIs, a DL DCI format can include an Acknowledgement Resource Offset (ARO) field (see also REF 2). Such a DL DCI format can be conveyed be an Enhanced PDCCH (EPDCCH). An ARO PUCCH resources corresponding to different DL TTIs and avoid PUCCH resource collisions among UEs. For a first DL TTI in a bundling window, represented by an index m=0, a mapping of a ARO field is same as in FDD and assists in compressing PUCCH resources corresponding to a same DL TTI. For each remaining DL TTI, represented by an index 0<m<M, a mapping of a ARO field can further assist in compressing PUCCH resources corresponding to different DL TTIs. Table 2A provides a mapping for values of an ARO field in a DL DCI format that the UE 114 receives in a DL TTI to an offset that the UE 114 applies in determining a respective PUCCH resource. $N_{ECCE,q,n-k_{i1}}$ is equal to a number of CCEs in a set q of DL resources configured for EPDCCH transmission to a UE in DL $TTI_{n-k_{i1}}$ (see also REF 3).

TABLE 2A

Mapping of ARO Field in a DL DCI format to $\Delta_{ARO}$ values in TDD

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 |

In order to improve utilization of carriers with small BWs or facilitate communication over different carrier frequencies, a communication system can include an aggregation of several carriers corresponding to different cells. For example, one carrier can have a BW of 10 MHz while another carrier can have a DL BW of 1.4 MHz or one carrier may operate at a frequency of 900 MHz while another carrier may operate at a frequency of 3.5 GHz. Then, as a spectral efficiency of PDCCH transmissions is typically low in small DL BWs, it can be preferable to schedule a PDSCH in a carrier with DL BW of 1.4 MHz from a carrier with DL BW of 10 MHz (cross-carrier scheduling). Also, as a path-loss is larger for higher carrier frequencies and control information typically requires higher detection reliability than data information and cannot benefit from retransmissions, it can be preferable to schedule a PDSCH in a 3.5 GHz carrier from a 900 MHz carrier.

In Carrier Aggregation (CA), each carrier represents a cell. The UE 114 can be configured by the eNB 102 through higher layer signaling more than one cell for PDSCH receptions (DL CA) or PUSCH transmissions (UL CA). For the UE 114 configured with DL CA or UL CA, UE-common control information in a respective PDCCH and SPS PDSCH or UCI in a respective PUCCH are transmitted, respectively, only in a DL and in an UL of a single cell that is referred to as Primary Cell (PCell). Other cells are referred to as Secondary Cells (SCells).

In CA, it is possible for the eNB 102 to schedule the UE 114 in a second cell by transmitting PDCCH conveying a DCI format in a first cell. This functionality is referred to as cross-carrier scheduling and DCI formats include a Carrier Indicator Field (CIF) having a value corresponding to a respective cell. For example, for a CIF consisting of 3 bits and the UE 114 configured with 5 cells, respective binary CIF values can be '000', '001', '010', '011', and '100' to indicate each of the 5 cells. When the UE 114 is configured with CA of 2 cells and with cross-carrier scheduling, all PDCCH are transmitted in the PCell. CA between a FDD carrier (cell) and a TDD carrier (cell) allows for greater flexibility in utilizing TDD and FDD spectrum, improves load balancing without inter-mode hand-over and, for a backhaul connection with negligible delay, it avoids a UCI reporting latency associated with TDD operation.

Several additional aspects exist for supporting CA between a FDD PCell and a TDD SCell. The additional aspects include a payload determination for HARQ-ACK information in response to PDSCH receptions in FDD cells and TDD cells, a determination of whether DCI format information fields that are specific to single-cell TDD operation need to be maintained in case of CA of FDD and TDD cells, and aspects for supporting cross-carrier scheduling from a FDD cell to a TDD cell. DCI format information fields that are different between FDD and TDD single-cell operation include a size of DL HARQ process number field that is larger for TDD operation, an existence of a DAI field in DL DCI formats, an existence of a DAI field in UL DCI formats, an existence at least for TDD UL-DL configuration 0 of an UL index field, and a mapping of values for an ARO field. Moreover, since a FDD PCell enables a UE (such as the UE 114) to transmit UL signals in every TTI and since, in many typical operating scenarios, DL traffic is substantially larger than UL traffic, it can be beneficial to reduce or eliminate a number of UL TTIs in a TDD SCell.

Several additional aspects exist for supporting CA between a TDD PCell and an FDD SCell. One aspect is a determination of an UL TTI for transmission in the TDD PCell of HARQ-ACK information in response to transmissions of DL DCI formats for the FDD SCell and a determination of a combined payload for HARQ-ACK information is in response to transmissions of DL DCI formats for both the TDD PCell and the FDD SCell. Another aspect is a determination for an existence and dimensioning of various fields in DCI formats for the FDD SCell, including a DL HARQ process number field, a DAI field, and a mapping for values of an ARO field in a DL DCI format, a DAI field or an UL index field in an UL DCI format. Yet another aspect is a support for transmission of HARQ-ACK information from the UE 114 either in the TDD PCell or in the FDD SCell. Yet another aspect is a support of cross-carrier scheduling from a TDD PCell to an FDD SCell.

Certain embodiments of this disclosure provide a mechanism for determining an HARQ-ACK information payload for aggregation of FDD cells and TDD cells with either a FDD PCell or a TDD PCell. Certain embodiments of this disclosure also provide a mechanism for determining an existence, a size, or a functionality of a DL HARQ process number field, of a DAI field, or of an ARO field in a DCI format scheduling PDSCH transmission (DL DCI format) to a UE in an SCell or an existence a size, or functionality of a DAI field or of an UL index field in a DCI format scheduling PUSCH transmission from a UE in an SCell with either a FDD PCell or a TDD PCell. Certain embodiments of this disclosure further provide a mechanism for supporting cross-carrier scheduling from a FDD scheduling cell to a TDD scheduled cell or from a TDD scheduling cell to a FDD scheduled cell. Moreover, certain embodiments of this disclosure provide definitions of new TDD UL-DL configurations for a UE configured with aggregation of FDD cells and TDD cells.

HARQ-ACK Payload Determination for FDD-TDD CA and FDD PCell

In certain embodiments, for a FDD PCell, a HARQ-ACK signal transmission can occur in every UL TTI. A HARQ-ACK signal transmission from the UE 114 in TTI n+k is transmitted in response to PDSCH receptions in TTI n, where for a FDD PCell k=4. For CA operation including FDD cells and TDD cells, where TDD cells (if more than one) use a same TDD UL-DL configuration, a payload of a HARQ-ACK signal transmitted from the UE 114 can depend on whether or not a respective TTI for TDD SCells is an UL one. If the TTI in TDD SCells is not an UL one, a HARQ-ACK payload is determined by including all TDD SCells configured to the UE 114; otherwise, only FDD cells are included. In case a TDD UL-DL configuration for a TDD SCell is adaptively configured to the UE 114 by physical layer signaling, such as by a DCI format conveyed by a PDCCH, a reference TDD UL-DL configuration configured to the UE 114 by higher layer signaling, such as RRC signaling, is used for generating HARQ-ACK information and determining a respective payload.

In accordance with a first approach, if the UE 114 is configured with $C_{FDD}$ cells and with a PDSCH TM supporting 2 data TBs in $C_{FDD,2} \le C_{FDD}$ cells, and with $C_{TDD}$ cells and with a PDSCH TM supporting 2 data TBs in $C_{TDD,2} \le C_{TDD}$ cells, the UE 114 determines a HARQ-ACK payload of $O_{HARQ-ACK}^{FDD\_TDD} = C_{FDD} + C_{FDD,2} + C_{TDD} + C_{TDD,2}$ information bits if a respective TTI in TDD SCells is not an UL one and the UE 114 determines a HARQ-ACK payload of $O_{HARQ-ACK}^{FDD} = C_{FDD} + C_{FDD,2}$ information bits if a respective TTI in TDD SCells is an UL one.

Figure 8:
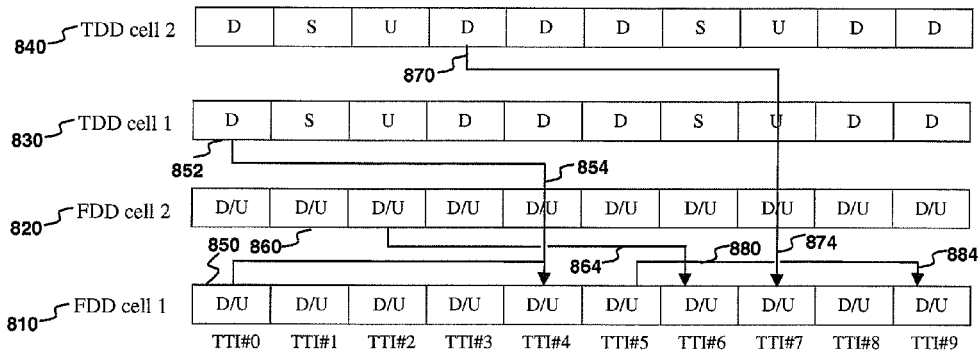
FIG. 8 illustrates an example determination of a HARQ-ACK payload for a FDD PCell and a TDD SCell using a first approach according to this disclosure.

FIG. 8 illustrates an example determination of a HARQ-ACK payload for a FDD PCell and a TDD SCell using a first approach according to this disclosure. The embodiment of the determination of a HARQ-ACK payload for the FDD PCell and the TDD SCell shown in FIG. 8 is for illustration only. Other embodiments could be used without departing from the scope of the present disclosure.

In the example shown in FIG. 8, the UE 114 is configured with a first FDD cell 810 which is the PCell for the UE 114, with a second FDD cell 820, with a first TDD cell 830 and with a second TDD cell 840. HARQ-ACK signal transmissions from the UE 114 are in the FDD PCell. For simplicity, the example shown in FIG. 8 assumes that the UE 114 is configured with a PDSCH TM conveying 2 data TBs. Also, if the UE 114 transmits HARQ-ACK information bits for cells where the UE 114 did not receive a PDSCH for a respective TTI, the UE 114 sets a value for each such HARQ-ACK information bit to NACK. Therefore, an absence of a data TB reception (DTX) and an incorrect detection of a data TB (NACK) are represented by a same HARQ-ACK bit value (NACK/DTX state). In TTI#0, the UE 114 receives PDSCH in the first FDD cell 850 and in the first TDD cell 852 and transmits $O_{HARQ-ACK}^{FDD\_TDD} = 8$ respective HARQ-ACK information bits for each PDSCH reception in TTI#4 using a second PUCCH format 854, such as described in FIG. 8 (or in a PUSCH if the UE 114 has a PUSCH transmission in TTI#4 and is not configured for simultaneous PUSCH and PUCCH transmissions). In TTI#2, the UE 114 receives PDSCH only in the second FDD cell 860 and transmits $O_{HARQ-ACK}^{FDD} = 4$ respective HARQ-ACK information bits in TTI#6 using a second PUCCH format 864 since TTI#2 is an UL TTI for the TDD cells and cannot convey PDSCH. In TTI#3, the UE 114 receives PDSCH only in the second TDD cell 870 and transmits $O_{HARQ-ACK}^{FDD\_TDD} = 8$ respective HARQ-ACK information bits in TTI#7 using a second PUCCH format 874. Finally, in TTI#5, the UE 114 receives PDSCH only in the FDD PCell 880 and transmits $O_{HARQ-ACK}^{FDD} = 2$ respective HARQ-ACK information bits in TTI#9 using a first PUCCH format 884, such as for example as described in FIG. 6. The eNB 102 can infer that the UE 114 did not receive any PDSCH other than the one in the FDD PCell by detecting an absence of a HARQ-ACK signal transmission for a second PUCCH format (or the presence of HARQ-ACK signal transmission for a first PUCCH format). Also, if the UE 114 did not receive any PDSCH (or SPS PDSCH release) in a TTI, the UE 114 does not transmit a HARQ-ACK signal.

Payload and UL TTI Determination for HARQ-ACK Transmission for FDD-TDD CA and TDD PCell In certain embodiments, for a TDD PCell, HARQ-ACK signal transmission can only occur in UL TTIs. HARQ-ACK signal transmission from the UE 114 in TTI n is in response to PDSCH receptions by the UE 114 in TTI n−k where, for a TDD PCell, k∈K as defined in Table 2 (see also REF 3). For CA between a FDD SCell and a TDD PCell, a HARQ-ACK payload depends on the bundling window size of the TDD PCell $M_{TDD}$ and on a DL association set index $K_{FDD}$ for a FDD SCell as it is subsequently described. In order to accommodate a TTI in a FDD cell for which a respective TTI in the TDD PCell is an UL one, a bundling window size, $M_{FDD}$, can be defined for the FDD SCell.

A first approach to determining a DL association set index $K_{FDD}$ for a FDD SCell considers minimizing a latency between a DL TTI the UE 114 receives PDSCH and decodes data TBs and an UL TTI the UE 114 transmits respective HARQ-ACK information. Table 3 indicates DL TTIs n−k, where k∈$K_{FDD}$, for which HARQ-ACK information in response to reception of PDSCHs conveying data TBs in a FDD SCell is in UL TTI n in a TDD PCell.

TABLE 3

Downlink association set index $K_{FDD}$: {$k_0, k_1, \ldots, k_{M_{FDD}-1}$}

| TDD UL-DL Configuration | TTI #n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | 4 | 4 | — | — | 6, 5, 4 | 4 | 4 |
| 1 | — | — | 7, 6, 5, 4 | 4 | — | — | — | 7, 6, 5, 4 | 4 | — |
| 2 | — | — | 8, 7, 6, 5, 4 | — | — | — | — | 8, 7, 6, 5, 4 | — | — |
| 3 | — | — | 11, 10, 9, 8, 7, 6, 5, 4 | 4 | 4 | — | — | — | — | — |
| 4 | — | — | 12, 11, 10, 9, 8, 7, 6, 5, 4 | 4 | — | — | — | — | — | — |
| 5 | — | — | 13, 12, 11, 10, 9, 8, 7, 6, 5, 4 | — | — | — | — | — | — | — |
| 6 | — | — | 7, 6, 5, 4 | 4 | 4 | — | — | 6, 5, 4 | 4 | — |

Although the DL association set index $K_{FDD}$ in Table 3 minimizes a latency between a DL TTI in which the UE 114 receives PDSCHs and decodes respective data TBs and an UL TTI in which the UE 114 transmits respective HARQ-ACK information, the latency results in an imbalance of HARQ-ACK information payloads transmitted in respective UL TTIs. For example, for TDD UL-DL configuration 1, HARQ-ACK information corresponding to detection of data TBs for up to 4 DL TTIs is transmitted in UL TTI#2 while HARQ-ACK information corresponding to detection of data TBs for up to 1 DL TTI is transmitted in TTI#3. This imbalance can result to unequal reception reliability for HARQ-ACK information transmitted in different UL TTIs and unequal respective coverage.

A second approach to determining a DL association set index $K_{FDD}$ for a FDD SCell considers balancing of HARQ-ACK information payload for both a TDD PCell and the FDD SCell while assuming that the DL association set index K in Table 2 is used for the TDD PCell. Table 4 indicates DL TTIs n−k, where k∈$K_{FDD}$, for which HARQ-ACK information in response to reception of data TBs in a FDD SCell is in UL TTI n in a TDD PCell.

TABLE 4

Downlink association set index $K_{FDD}$: $\{k_0, k_1, ..., k_{M_{FDD}-1}\}$

| TDD UL-DL Configuration | TTI #n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8 | 8, 7, 6 | 6, 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 7, 5 | 5, 4 | 8, 4 | — | — | 7, 6 | 5, 4 | — |

The second approach can be extended also between a TDD PCell and a TDD SCell. A DL association set index K for a TDD PCell can be as in Table 2 while a DL association set index K for a TDD SCell as in Table 4A.

TABLE 4A

Downlink association set index K for TDD SCell: $\{k_0, k_1, ... k_{M-1}\}$

| TDD UL-DL Configuration | TTI #n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7 | 7, 4 | — | — | — | 7 | 7, 4 | — |
| 2 | — | — | 8, 7, 4, 6 | — | — | — | — | 8, 7, 4, 6 | — | — |
| 3 | — | — | 7, 11 | 7, 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The first approach or the second approach for determining a DL association set index $K_{FDD}$ for a FDD SCell aim to optimize a performance metric such as to minimize a reporting latency for HARQ-ACK information or improve a balance of HARQ-ACK information payloads in different UL TTIs, respectively. However, both these approaches represent a significant change relative to determining a DL association set index K for a single TDD cell. A consequence is that different processing of HARQ-ACK information for scheduling will be needed at the eNB 102 and different generation of HARQ-ACK information will be needed at the UE 114 depending on whether an associated cell is a TDD PCell (or a single TDD cell) or a FDD SCell.

A third approach for determining a DL association set index $K_{FDD}$ for a FDD SCell considers minimizing modifications to the eNB 102 processing or to the UE 114 generation and reporting of HARQ-ACK information for a FDD SCell, relative to respective ones for a TDD PCell. Table 5 indicates DL TTIs n−k, where k∈$K_{FDD}$, for which HARQ-ACK information in response to reception of data TBs in a FDD SCell is in UL TTI n in a TDD PCell.

TABLE 5

Downlink association set index $K_{FDD}$: $\{k_0, k_1, ..., k_{M_{FDD}-1}\}$

| TDD UL-DL Configuration | TTI #n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5 | 5, 4 | — | — | — | 7, 6, 5 | 5, 4 | — |
| 2 | — | — | 8, 7, 6, 5, 4 | — | — | — | — | 8, 7, 6, 5, 4 | — | — |
| 3 | — | — | 11, 10, 7, 6 | 10, 6, 5 | 10, 5, 4 | — | — | — | — | — |
| 4 | — | — | 12, 11, 10, 8, 7 | 10, 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 7, 5 | 5, 4 | 8, 4 | — | — | 7, 6 | 5, 4 | — |

Combinations of the above approaches for a determination of a DL association set index $K_{FDD}$ for a FDD SCell (which for some TDD UL-DL configuration is same between the second approach and the third approach) can also be considered depending upon a TDD UL-DL configuration. For example, for TDD UL-DL configuration 0, Table 4 can be considered while for TDD UL-DL configuration 3, Table 5 can be considered. Moreover, unlike the ordering of DL TTIs in Table 2 for reporting respective HARQ-ACK information for a TDD cell, an ordering of DL TTIs for reporting respective HARQ-ACK information for a FDD SCell is according to the order of the DL TTIs. The ordering is because, for special DL TTIs in a TDD cell, a DL TTI with a same index is a normal DL TTI in a FDD SCell.

A determination of a HARQ-ACK information payload in an UL TTI for the UE 114 configured with a TDD PCell and a FDD SCell can be obtained from a DL association set index $K_{FDD}$ for a FDD SCell. For example, for TDD UL-DL configuration 2, or 4, or 5, or 6 (having same respective DL association set index $K_{FDD}$ in Table 4 and Table 5), the HARQ-ACK information payload is $M_{FDD}=M_{TDD}+1$. For remaining TDD UL-DL configurations, the HARQ-ACK information payload can be either $M_{FDD}=M_{TDD}$, or $M_{FDD}=M_{TDD}+1$ or $M_{FDD}=M_{TDD}+2$ depending on a DL association set index $K_{FDD}$ used for a FDD SCell.

In a first approach, the UE 114 with a TDD PCell and an FDD SCell determines a HARQ-ACK information payload by assuming a bundling window size of $M_{FDD}$ regardless of whether a cell is a TDD one or an FDD one. If $M_{TDD}<M_{FDD}$ then, for the TDD PCell, the UE 114 can set to DTX the HARQ-ACK information bits corresponding to DL TTIs with index j, $M_{TDD} \le j < M_{FDD}$, in a bundling window of $M_{FDD}$ DL TTIs.

Figure 9:
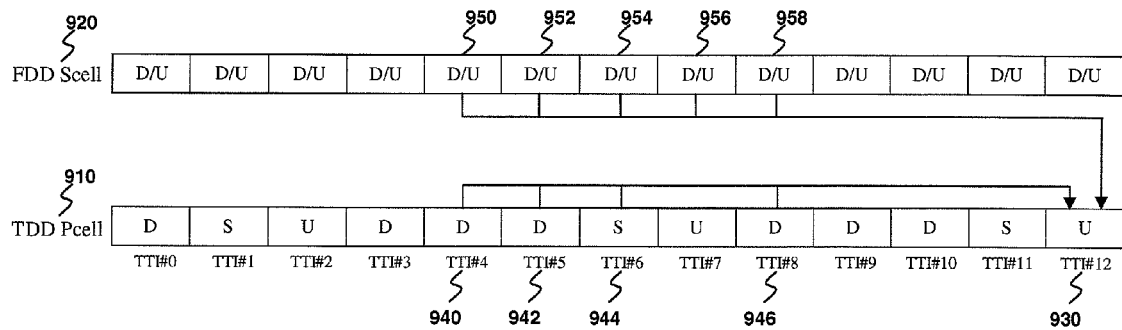
FIG. 9 illustrates an example determination of a HARQ-ACK payload for a TDD PCell and a FDD SCell using a first approach according to this disclosure.

FIG. 9 illustrates an example determination of a HARQ-ACK payload for a TDD PCell and a FDD SCell using the first approach according to this disclosure. The embodiment of the HARQ-ACK payload for the TDD PCell and the FDD SCell shown in FIG. 9 is for illustration only. Other embodiments could be used without departing from the scope of the present disclosure.

In the example shown in FIG. 9, the UE 114 is configured with a TDD PCell 910 and with a FDD SCell 920. The UE 114 transmits HARQ-ACK information in the TDD PCell in UL TTI#12 930. For the TDD PCell, the UE 114 transmits HARQ-ACK information in UL TTI#2 in response to one or more PDSCH receptions in respective one or more DL TTIs that include TTI#4 940, TTI#5 942, TTI#6 944, and TTI#8 946. Therefore, $M_{TDD}=4$. For the FDD SCell, the UE 114 transmits HARQ-ACK information in UL TTI#2 in response to one or more PDSCH receptions in respective one or more DL TTIs that include TTI#4 950, TTI#5 952, TTI#6 954, TTI#7 956, and TTI#8 958. Therefore, $M_{FDD}=5$. Since $M_{TDD}<M_{FDD}$, for a same bundling window size of $M_{FDD}$ DL TTIs for both the TDD PCell and the FDD SCell, the UE 114 can set HARQ-ACK information corresponding to the last (virtual) $M_{FDD}-M_{TDD}$ DL TTIs for the TDD PCell to DTX (or NACK).

A consequence of having a FDD SCell when the TDD PCell has a bundling window size of $M_{TDD}=4$, such as in the case of TDD UL-DL configuration 2 or 4, is that $M_{FDD}>4$. A bundling window size larger than 4 precludes a use of HARQ-ACK multiplexing using PUCCH Format 1b with channel selection (see also REF 3) and a transmission structure, such as the example shown in FIG. 3. This can be one mode of operation (HARQ-ACK multiplexing using PUCCH Format 1b with channel selection is precluded) in case of a FDD SCell with a TDD PCell having $M_{TDD}=4$.

In a first alternative for enabling use of HARQ-ACK multiplexing using PUCCH Format 1b with channel selection, an effective bundling window size $M_{FDD,eff}$ can be defined when $M_{FDD}>4$ such that $M_{FDD,eff}=M_{TDD}$ or $M_{FDD,eff}=4$. The meaning of $M_{FDD,eff}$ is that even though a bundling window size $M_{FDD}>M_{FDD,eff}$ exists, the UE 114 can expect to be scheduled only in $M_{FDD,eff}$ TTIs from the $M_{FDD}>M_{FDD,eff}$ TTIs in a FDD SCell. The UE 114 can associate a TTI with respective HARQ-ACK information based on a DAI field included in a DL DCI format scheduling a PDSCH reception in the TTI in the FDD SCell. Once the UE 114 detects a DL DCI format with a DAI value indicating that a respective PDSCH is the $M_{FDD,eff}$ PDSCH transmitted to the UE 114 in a same bundling window, the UE 114 can disregard detection of DL DCI formats in next TTIs of the same bundling window. For example, referring to FIG. 9, if the UE 114 detects a DL DCI format for the FDD SCell for TTI#4 950, TTI#5 952, TTI#6 954, and TTI#7 956, the UE 114 disregards detection of a DL DCI format in TTI#8 958. Otherwise, if the UE 114 does not detect a DL DCI format for the FDD SCell for any one or more of TTI#4 950, TTI#5 952, TTI#6 954, and TTI#7 956, the UE 114 considers a detection of a DL DCI format in TTI#8 958. The introduction of a DAI field in respective DL DCI formats for operation in a FDD SCell is subsequently described.

In a second alternative for enabling use of HARQ-ACK multiplexing using PUCCH Format 1b with channel selection, bundling can be used for HARQ-ACK information corresponding to DL DCI formats in TTIs a bundling window having a DAI field indicating a value between $M_{FDD,eff}-1$ and $M_{FDD}-1$. With such time domain bundling, a single HARQ-ACK information is generated for PDSCH receptions in respective TTIs of a bundling window having an index between $M_{FDD,eff}-1$ and $M_{FDD}-1$ by successively using an exclusive OR (XOR) operation. The XOR operation is defined as: XOR(0,0)=0, XOR(0,1)=1, XOR(1,0)=1, XOR(1,1)=0. For example, for TDD UL-DL configuration 2 or 4 and a DL association set index $K_{FDD}$ for a FDD SCell as in Table 4 or Table 5, $M_{FDD,eff}=4$ and $M_{FDD}=5$. Then, if the UE 114 detects DL DCI formats in all TTIs of a bundling window, a DAI value in the last two DL DCI formats shall have a value of 3 and 4, respectively, and the UE 114 performs bundling for the respective HARQ-ACK information in order to generate a single HARQ-ACK information for the last two TTIs in the bundling window for the FDD SCell.

In the above example, the UE 114 does not perform bundling of HARQ-ACK information in the last two TTIs if the UE 114 did not detect DL DCI formats for each of the two TTIs and if the value of the DAI field in each of the two DL DCI formats is not 3 and 4, respectively. Also, the UE 114 applies the previous bundling of HARQ-ACK information only for the FDD SCell while for the TDD PCell, the HARQ-ACK information payload is $M_{TDD}=4$ and bundling of HARQ-ACK information is not needed. For example, referring to FIG. 9, the UE 114 does not bundle HARQ-ACK information corresponding to detections of DL DCI formats for the TDD PCell while the UE 114 performs bundling of HARQ-ACK information corresponding to detections of two DL DCI formats for the FDD SCell for TTI#7 956 and TTI#8 958 only if a value of a DAI field in each of the two DL DCI formats is respectively 3 and 4, that is, only if the UE 114 detected DL DCI formats for each FIT of the bundling window that includes $M_{FDD}=5$ TTIs.

In a second approach, the UE 114 with a TDD PCell and a FDD SCell determines a HARQ-ACK information payload by assuming respective bundling window sizes of $M_{TDD}$ and $M_{FDD}$. For example, the second approach can apply when PUCCH Format 3 (see also REF 1) is used by the UE 114 to transmit HARQ-ACK information. The UE 114 can order HARQ-ACK information bits according to a cell index, such as first for the TDD PCell and second for the FDD SCell. Subsequently, the UE 114 can interleave the HARQ-ACK information bits prior to encoding with a dual RM code when a combined payload exceeds 11 bits (see also REF 2). The UE 114 generates $O_{TDD} \cdot M_{TDD}$ HARQ-ACK information bits for the TDD PCell and $O_{FDD} \cdot M_{FDD}$ HARQ-ACK information bits for the FDD SCell for a total payload of $O_{TDD} \cdot M_{TDD} + O_{FDD} \cdot M_{FDD}$ bits, where $O_{TDD}$ is a number of HARQ-ACK information bits for a PDSCH TM the UE 114 is configured for the TDD PCell and $O_{FDD}$ is a number of HARQ-ACK information bits for a PDSCH TM the UE 114 is configured for the FDD SCell.

Referring to FIG. 9, assuming $O_{TDD}=2$ and $O_{FDD}=1$, which implies that the UE 114 is configured a PDSCH TM conveying up to two data TBs in the TDD PCell and one data TB in the FDD SCell, the UE 114 detects at least one DL DCI format for the TDD PCell 910 and at least one DL DCI format for the FDD SCell 920 and generates 8 HARQ-ACK information bits for respective TTIs 940, 942, 944, 946 of the bundling window of the TDD PCell and 5 HARQ-ACK bits for respective TTIs 950, 952, 954, 956, and 958 of the bundling window of the FDD SCell for transmission in UL TTI#12 930. For DL TTIs where the UE 114 does not detect a DL DCI format, respective HARQ-ACK bits can be set to a NACK/DTX value.

A benefit of the second approach (not assuming the maximum bundling window size of $M_{FDD}$ for both the TDD PCell and the FDD SCell by excluding TTIs that are UL TTIs on the TDD PCell) is that a total payload is not unnecessarily increased by including fixed HARQ-ACK information bits (each set to a NACK/DTX value), thereby reducing a probability that a dual RM code instead of a single RM code is used (when a total HARQ-ACK information payload exceeds a first value such as 11) or reducing a probability that bundling of HARQ-ACK information bits corresponding to 2 data TBs conveyed by a same PDSCH is used in order to decrease a total HARQ-ACK information payload below a second value such as 23.

DL HARQ Process Number Field, DAI Field, and ARO Field in a DL DCI Format and DAI Field and UL Index Field in an UL DCI Format for Scheduling in a TDD SCell in Case of a FDD PCell In certain embodiments, for a DL HARQ process number field in a DCI format scheduling PDSCH in a TDD SCell having a FDD PCell, HARQ-ACK transmissions can occur in every TTI (either on a PUCCH in the FDD PCell or in a PUSCH either in the FDD PCell or in the TDD SCell). As a consequence, there is no additional latency required for HARQ-ACK reporting from the UE 114, as in TDD only operation, and therefore there is no need to support a larger number of DL HARQ processes for PDSCH transmissions in the TDD SCell than in the FDD PCell. Therefore, in case of CA between a FDD PCell and a TDD SCell, there is no need to have more HARQ processes for scheduling PDSCH in the TDD SCell and DL DCI formats for PDSCH scheduling either in the FDD PCell or in the TDD SCell have a same number of bits for DL HARQ process field, such as for example 3 bits to support up to 8 HARQ processes.

Similar to the DL HARQ process number field, as transmission of HARQ-ACK information from the UE 114 can occur in every TTI, a respective bundling window size for a IUD SCell is effectively always equal to 1 TTI. Therefore, in case of CA between a FDD PCell and a TDD SCell, DL DCI formats for PDSCH scheduling in the TDD SCell do not include a DAI field that functions as a counter of a DL DCI format in a bundling window in case of single-cell TDD operation. This absence of a DAI field in a DL DCI format in case of a FDD PCell and a TDD SCell, in conjunction with an equal size for a DL HARQ process number field in DL DCI formats scheduling PDSCH in a FDD PCell or in a TDD SCell, result to a DL DCI format having a same size regardless of whether a respective PDSCH is scheduled in a FDD PCell or in a TDD SCell.

Additionally, as transmission of HARQ-ACK information from the UE 114 can occur in every TTI, a mapping of an ARO field in a DL DCI format intended for a TDD SCell can be as for a FDD PCell since PUCCH resource compression in the time domain is not required. Therefore, unlike for single-cell TDD operation, certain embodiments of this disclosure consider that a mapping of an ARO field in a DL DCI format is as for m=0 in Table 2A for all DL TTIs in a TDD SCell In case of cross-carrier scheduling of a TDD SCell from a FDD PCell, DL DCI formats can be transmitted in the FDD PCell in every TTI. In this case, regardless of whether a TDD UL-DL configuration has more DL TTIs or more UL TTIs in a frame, an UL index field in an UL DCI format for indicating to the UE 114 a number of TTIs for PUSCH transmission is not required (in case of TDD UL-DL configuration 0). For the TDD SCell, this also implies a new HARQ timing as the DCI format scheduling a PUSCH transmission in TTI n in the TDD SCell is transmitted in TTI n−4 in the FDD PCell. Evidently, if HARQ timing for the TDD SCell remains as for conventional single-cell operation, the UL index field also remains present in an UL DCI format scheduling a PUSCH transmission in the TDD SCell (in case of TDD UL-DL configuration 0) since UL DCI formats in the FDD PCell for scheduling PUSCH in the TDD SCell are transmitted in same TTIs as for single-cell TDD operation.

For a FDD PCell, a HARQ-ACK signal transmission can occur in every TTI. A HARQ-ACK signal transmission from the UE 114 in TTI n+k is in response to PDSCH receptions in TTI n where for a FDD PCell k=4. As a consequence, a HARQ-ACK signal transmission in a FDD PCell either does not include any HARQ-ACK information bits for a TDD SCell (if a respective TTI is an UL one) or includes HARQ-ACK bits in response to a single PDSCH reception in the TDD SCell. Therefore, a DAI field of 2 bits capable of indicating inclusion of HARQ-ACK information bits in a PUSCH for up to 4 TTIs (4 DL DCI formats) of the TDD SCell is not required and a respective signaling overhead in UL DCI formats for TDD cells can be avoided.

In a first approach, a DAI field is not included in UL DCI formats scheduling PUSCH. Then, when the UE 114 multiplexes (in a PUSCH) HARQ-ACK information bits in response to a PDSCH reception in a FDD PCell or in response to PDSCH reception in a TDD SCell, the UE 114 includes HARQ-ACK information bits for all cells by setting to a NACK/DTX value each HARQ-ACK information bit corresponding to a cell for which the UE 114 did not receive a PDSCH in a respective TTI. For self-carrier scheduling and all TDD UL-DL configurations in Table 1 other than TDD UL-DL configuration 0, the first approach results to an UL DCI format having a same size regardless of whether a respective PUSCH is scheduled in a FDD cell or in a TDD cell. In case of cross-carrier scheduling for a PUSCH transmission in a TDD SCell from a FDD PCell, the previous conclusion applies also for TDD UL-DL configuration 0 in case a different HARQ timing applies and an UL index field is omitted from an UL DCI format and was previously described.

Figure 10:
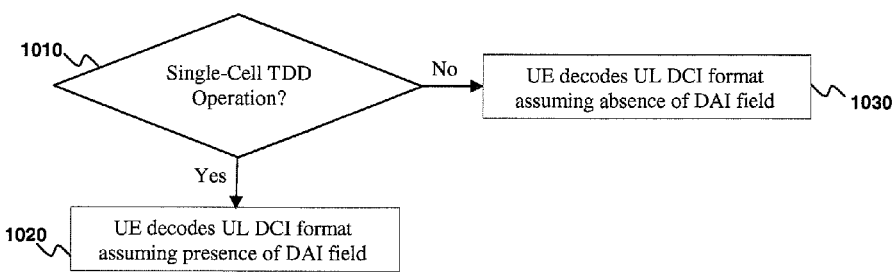
FIG. 10 illustrates an example use of a DAI field in an UL DCI format depending on whether or not a respective UE operates in a single TDD cell or in CA with a FDD PCell and a TDD SCell according to a first approach in this disclosure.

FIG. 10 illustrates an example use of a DAI field in an UL DCI format depending on whether or not a respective UE operates in a single TDD cell or in CA with a FDD PCell and a TDD SCell according to a first approach in this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 10, in detecting an UL DCI format for PUSCH scheduling in a TDD cell, the UE 114 considers whether a respective operation is for a TDD single cell (including for a TDD PCell) or for a TDD SCell with a FDD PCell in operation 1010. If the UE 114 operates in a TDD single cell (with a TDD UL-DL configuration other than TDD UL-DL configuration 0), the UE decodes an UL DCI format assuming an inclusion of a DAI field in operation 1020. If the UE 114 operates with CA between at least one FDD PCell and at least one TDD SCell, the UE 114 decodes an UL DCI format assuming an absence of a DAI field in operation 1030.

In a second approach, a DAI field of one bit is included in UL DCI formats to indicate whether the UE 114 should multiplex (in a PUSCH) HARQ-ACK information bits regardless of whether or not the UE 114 actually receives a PDSCH. In a first option, the DAI field is applicable only to SCells. In a second option, the DAI field is applicable to all cells. Which option is used can be defined by the system operation or signaled by system information. For example, for a FDD PCell and a TDD SCell, a DAI field with a value of '0' indicates no HARQ-ACK multiplexing in a respective PUSCH while a DAI field with a value of '1' indicates HARQ-ACK multiplexing either corresponding to a TDD SCell (first option) or to both a FDD PCell and a TDD SCell (second option). The DAI field is included in an UL DCI format because a DL DCI format scheduling a PDSCH, for which respective HARQ-ACK bits need to be included in a PUSCH, can be transmitted in the TDD SCell while an UL DCI format scheduling the PUSCH can be transmitted in a FDD cell. Then, as the two DCI formats are transmitted in different cells where the UE 114 can be experiencing different operating conditions, it is possible that the UE 114 detects the UL DCI format, misses the DL DCI format and without a DAI field, the UE 114 cannot know whether to include HARQ-ACK information for the TDD SCell in the PUSCH.

Figure 11:
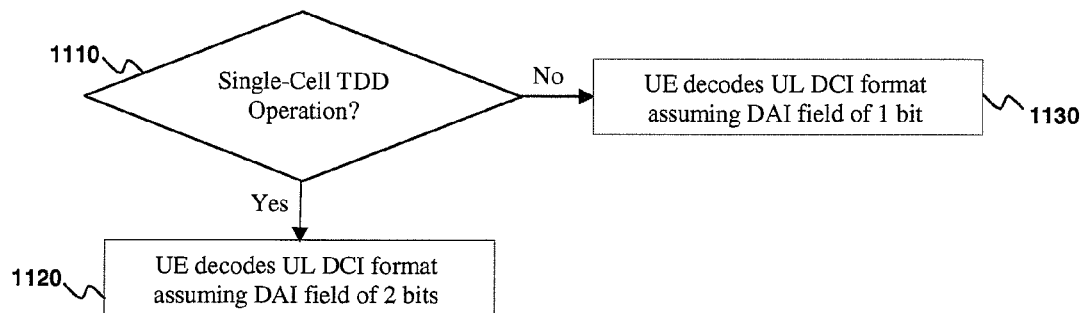
FIG. 11 illustrates an example use of a DAI field in an UL DCI format depending on whether or not a respective UE operates in a single TDD cell or in CA with a FDD PCell and a TDD SCell according to a second approach in this disclosure.

FIG. 11 illustrates an example use of a DAI field in an UL DCI format depending on whether or not a respective UE operates in a single TDD cell or in CA with a FDD PCell and a TDD SCell according to a second approach in this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 11, in detecting an UL DCI format for PUSCH scheduling, the UE 114 considers whether a respective operation is for a TDD single cell or for a TDD SCell with a FDD PCell in operation 1110. If the UE 114 operates in a TDD single cell, the UE 114 decodes an UL DCI format assuming an inclusion of a DAI field of 2 bits in operation 1120. If the UE 114 operates with CA between at least one FDD cell and at least one TDD cell, wherein a FDD cell is the PCell, the UE 114 decodes an UL DCI format assuming an inclusion of a DAI field of 1 bit in operation 1130.

In a third approach, a DAI field of two bits is included in UL DCI formats but its interpretation is modified relative to that for single-cell TDD operation. The DAI field of two bits can indicate whether the UE 114 should not multiplex (in a PUSCH) any HARQ-ACK bits using for example a value '00', whether the UE 114 should multiplex HARQ-ACK bits for a first set of cells using for example a value of '01', whether the UE 114 should multiplex HARQ-ACK bits a second set of cells using for example a value of '10', and whether the UE 114 should multiplex HARQ-ACK bits for all cells using for example a value of '11'. The first set of cells and the second set of cells can be configured to the UE 114 in advance through higher layer signaling. For example, for CA with 2 cells, the first set of cells may include only the PCell and the second set of cells may include only the TDD SCell.

Figure 12:
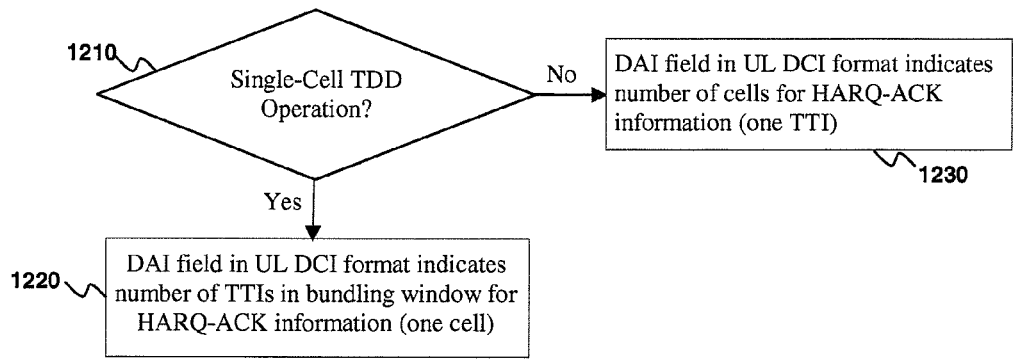
FIG. 12 illustrates an example interpretation for a DAI field in an UL DCI format depending on whether or not a respective UE operates in a single TDD cell or in CA with a FDD PCell and a TDD SCell according to a third approach in this disclosure.

FIG. 12 illustrates an example interpretation for a DAI field in an UL DCI format depending on whether or not a respective UE operates in a single TDD cell or in CA with a FDD PCell and a TDD SCell according to a third approach in this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 12, the UE 114 detects an UL DCI format for PUSCH scheduling in a TDD cell wherein the UL DCI format includes a DAI field of 2 bits. The UE 114 considers whether a respective operation is for a TDD single cell or for a TDD SCell with a FDD PCell in operation 1210. If the UE 114 operates in a TDD single cell, the UE 114 interprets the DAI field as indicating a number of TTIs in a bundling window for which the UE 114 includes HARQ-ACK information in the PUSCH in operation 1220. If the UE 114 operates with CA between at least one FDD cell and at least one TDD cell, with FDD PCell, the UE 114 interprets the DAI field as indicating a set of cells for which the UE 114 should include HARQ-ACK information in the PUSCH in operation 1230.

A removal of a DAI field in an UL DCI format for PUSCH scheduling to the UE 114 in a TDD SCell, a removal of a DAI field and a reduction of a DL HARQ process number field from 4 bits to 3 bits in a DL DCI format for PDSCH scheduling to the UE 114 in a IUD SCell, and a remapping of the ARO values in a DL DCI format for PDSCH scheduling to the UE 114 in a TDD SCell are associated with transmission of HARQ-ACK information from the UE in the FDD PCell. If the UE 114 transmits HARQ-ACK in the TDD SCell, the previous fields remain unchanged (i.e., remain the same) and exist in DCI formats as for single-cell TDD operation.

DL HARQ Process Number Field, DAI Field, and ARO Field in a DL DCI Format and DAI Field and UL Index Field in an UL DCI Format for Scheduling in a FDD SCell in Case of a TDD PCell In certain embodiments, for the UE 114 configured with a TDD PCell and a FDD SCell, when the UE 114 transmits PUCCH only in the TDD PCell, a transmission timing of HARQ-ACK information in response to detecting one or more DL DCI formats for the FDD SCell is determined by an availability of UL TTIs in the TDD PCell and, unlike conventional FDD operation, transmission of HARQ-ACK information cannot occur in every TTI of a TDD PCell. Therefore, a bundling window size for transmission of HARQ-ACK information in response to detecting one or more DL DCI formats can be larger than 1. In general, whenever a bundling window size is larger than 1, a DAI field is included in an UL DCI format.

Due to an additional latency required for the UE 114 to report HARQ-ACK information in a TDD PCell in response to detecting one or more DL DCI formats scheduling respective PDSCHs in a FDD SCell, a larger number of DL HARQ processes for PDSCH transmissions in the FDD SCell needs to be supported compared to the case of a FDD PCell. For example, considering a delay of 3 TTIs between an end (or a delay of 4 TTIs between a beginning) of a PDSCH transmission from the eNB 102 and an availability of a respective HARQ-ACK information at the UE 114, a delay of 3 TTIs between an end (or a delay of 4 TTIs between a beginning) of a HARQ-ACK transmission at the UE 114 and an availability of a scheduling decision for a same HARQ process at an NB, and a delay of up to 13 TTIs for reporting HARQ-ACK information in case the TDD PCell uses TDD UL-DL configuration 5 (as indicated in Table 3, 4, or 5), a maximum delay of 17 TTIs can occur thereby requiring a maximum of 17 HARQ processes.

Consequently, for CA between a TDD PCell and a FDD SCell, a DL HARQ process number field in a DL DCI format for the FDD SCell includes a larger number of bits than in case of a FDD PCell (including single-cell FDD operation). This number of bits for the DL HARQ process number field can be same as the one for the DL HARQ process number field in a DL DCI format for the TDD PCell. For example, in case of a TDD PCell and a FDD SCell, a DL HARQ process number field in each DL DCI format can include 4 bits, regardless of whether a DL DCI format is intended for the TDD PCell or the FDD SCell, while in case of a FDD PCell a DL HARQ process number field in each DL DCI format can include 3 bits, regardless of whether a DL DCI format is intended for the FDD PCell or a FDD SCell or TDD SCell. In case the TDD SCell uses TDD UL-DL configuration 5, a restriction is that a number of HARQ processes for the FDD SCell is up to 16, instead of a maximum possible of 17, but this is a minor restriction and avoids using an additional bit for a DL HARQ process number field in a DL DCI format scheduling PDSCH in the FDD SCell.

Figure 13:
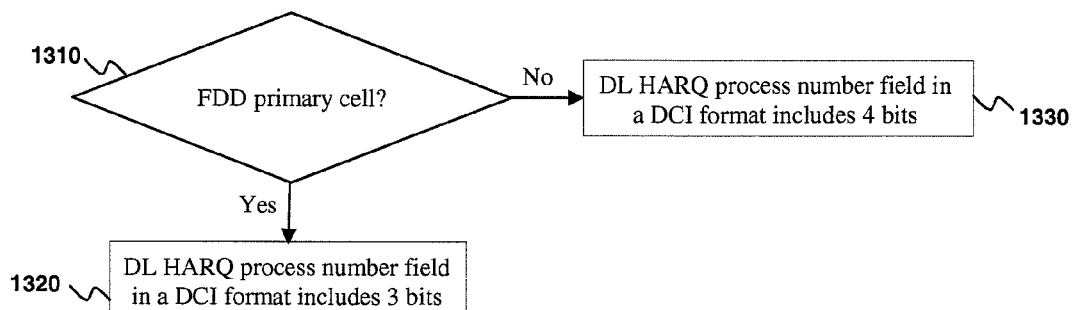
FIG. 13 illustrates an example method for determining a size of a DL HARQ process number field in a DL DCI format depending on whether a PCell is an FDD cell or a TDD cell according to this disclosure.

FIG. 13 illustrates an example method for determining a size of a DL HARQ process number field in a DL DCI format depending on whether a PCell is an FDD cell or a TDD cell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a base station.

As shown in FIG. 13, in detecting a DL DCI format for a FDD cell or a TDD cell, the eNB 102 and the UE 114 consider whether a respective operation is for a FDD PCell or for a TDD PCell in operation 1310. If the UE 114 operates with a FDD PCell, a DL HARQ process number field in a DL DCI format for the UE 114 includes 3 bits in operation 1320. If the UE 114 operates with a TDD PCell, a DL HARQ process number field in a DL DCI format for the UE 114 includes 4 bits in operation 1330.

Similar to the DL HARQ process number field, as transmission of HARQ-ACK information from a UE cannot typically occur in successive TTIs in case of a TDD PCell, a respective bundling window size for a FDD SCell can be larger than 1 TTI. Therefore, in case of CA between a TDD PCell and a FDD SCell, a DL DCI format for the FDD SCell needs to include a DAI field that functions as a counter of a DL DCI format in a bundling window similar to the DAI field in DL DCI format for a TDD PCell. This existence of a DAI field in a DL DCI format in case of a TDD PCell, in conjunction with an equal size for a DL HARQ process number field in DL DCI formats for the TDD PCell and a FDD SCell, result to a DL DCI format having a same size regardless of whether it is intended for a TDD PCell or a FDD SCell. In case of a FDD PCell, a DAI field can be omitted from a DL DCI format for a TDD SCell. It is noted that a DAI field for a FDD SCell (with a TDD PCell) can include 2 bits even though $M_{FDD}$ can be larger than 4 and the UE 114 can determine an index for a respective DL DCI format in a bundling window based on an index of a last detected DL DCI format within a same bundling window. For example, a DAI field binary value of '00' can map either to a DL DCI format index of either 1, or 5 (if applicable), or (if applicable) 9 within a same bundling window and the UE 114 can determine a value of 5 if it previously detected a single DL DCI format including a DAI field with binary value of '01', or '10', or '11'. Similar, a DAI field binary value of '01' can map either to a DL DCI format index of either 2, or 6 (if applicable), or (if applicable) 10 within a same bundling window and the UE 114 can determine a value of 6 if the UE 114 previously detected a single DL DCI format including a DAI field with binary value of '10' or '11'.

Figure 14:
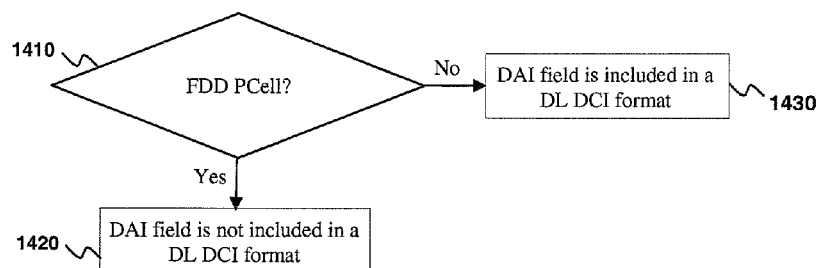
FIG. 14 illustrates an example method for determining an existence of a DAI field in a DL DCI format depending on whether a PCell is an FDD cell or a TDD cell according to this disclosure.

FIG. 14 illustrates an example method for determining an existence of a DAI field in a DL DCI format depending on whether a PCell is an FDD cell or a TDD cell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 14, in detecting a DL DCI format for a FDD cell or a TDD cell, the UE 114 considers whether a respective operation is for a FDD PCell or for a TDD PCell in operation 1410. If the UE 114 operates with a FDD PCell, a DAI field is not included in a DL DCI format for the UE in operation 1420. If the UE 114 operates with a TDD PCell, a DAI field is included in a DL DCI format for the UE 114 in operation 1430.

As previously mentioned, a transmission of HARQ-ACK information from the UE 114 cannot typically occur in successive TTIs and a respective bundling window size for a FDD SCell can be larger than 1 TTI. Therefore, in case of a TDD PCell and a FDD SCell, a mapping of an ARO field in a DL DCI format intended for PDSCH scheduling in the FDD SCell can be as for the TDD PCell since compression in the time domain is also required. Therefore, for a bundling window size of $M_{FDD}$ for the FDD SCell, a mapping of a ARO field in a DL DCI format the UE 114 receives in DL TTI with index m in the bundling window can be as in Table 2A with M replaced by $M_{FDD}$.

For conventional operation in a FDD cell, a DAI field in an UL DCI format indicating to the UE 114 to multiplex HARQ-ACK information in a PUSCH transmission does not need to be included in the UL DCI format. This is because HARQ-ACK information is generated in response to a DL DCI format that is transmitted in a same TTI (and in a same cell) as an UL DCI format scheduling a PUSCH transmission, and therefore it is highly likely that the UE 114 either detects both DCI formats or misses both DCI formats, and because HARQ-ACK information in response to a DL DCI format detection in a previous TTI is already transmitted in a respective previous PUSCH or PUCCH. The same applies for single cell TDD operation using TDD UL-DL configuration 0 that includes more UL TTIs than DL TTIs (and special TTIs). Therefore, an additional explicit indication to the UE 114, through a use of a DAI field in an UL DCI format, to multiplex HARQ-ACK information in a PUSCH transmission is not essential.

In case of an FDD SCell with a TDD PCell, a DAI field needs to be included in an UL DCI format scheduling a PUSCH transmission in the FDD SCell. In Table 4, for TDD UL-DL configuration 0, TTI#3 and TTI#8 are used to transmit HARQ-ACK information only for PDSCH reception in a FDD SCell. If the eNB 102 schedules the UE 114 a PUSCH transmission in the TDD PCell and also schedules a PUSCH transmission in a FDD SCell in TTI#3, the value of the DAI field in the UL DCI format scheduling the PUSCH transmission in the FDD SCell can indicate multiplexing of HARQ-ACK information in the PUSCH transmission in the TDD PCell even though the UL DCI format scheduling the PUSCH transmission in the TDD PCell does not include a DAI field and does not indicate HARQ-ACK multiplexing in the PUSCH transmission in the TDD PCell. Alternatively, in this case, HARQ-ACK multiplexing is in the PUSCH transmission in the FDD SCell.

For operation with a TDD PCell, HARQ-ACK information in response to a detection of DL DCI format for a FDD SCell in a previous TTI is not transmitted in any TTI where the UE 114 transmits a PUSCH in a FDD SCell. This is because a respective UL TTI may not exist for the TDD UL-DL configuration in the TDD PCell in order for the UE 114 to transmit that HARQ-ACK information or because due to the HARQ-ACK transmission timing, as for example in Table 4, the UL TTI may not be one where the UE 114 transmits HARQ-ACK information. In case of a FDD PCell, a DAI field can be omitted from an UL DCI format for a TDD SCell as was previously discussed.

Figure 15:
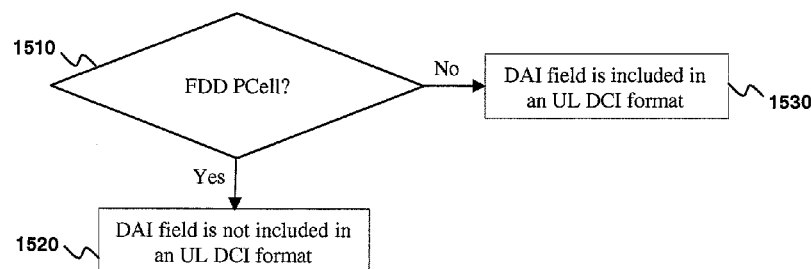
FIG. 15 illustrates an example method for determining an existence of a DAI field in an UL DCI format depending on whether a PCell is an FDD cell or a TDD cell according to this disclosure.

FIG. 15 illustrates an example method for determining an existence of a DAI field in an UL DCI format depending on whether a PCell is an FDD cell or a TDD cell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 15, in detecting an UL DCI format scheduling PUSCH for a FDD cell, the UE 114 considers whether a respective operation is for a FDD PCell or for a TDD PCell in operation 1510. If the UE 114 operates with a FDD PCell, a DAI field is not included in the UL DCI format for the UE 114 in operation 1520. If the UE 114 operates with a TDD PCell, a DAI field is included in the UL DCI format 1530.

In case a TDD PCell uses TDD DL-UL configuration 0, a DAI for HARQ-ACK from the FDD SCell can be included in UL DCI formats transmitted in the TDD PCell even though it is not included in case of single TDD cell operation with TDD DL-UL configuration 0. This is because HARQ-ACK timing in response to PDSCH reception can be different between TDD and FDD (for example, in Table 4, unlike Table 2, HARQ-ACK information for more than one TTIs of the FDD SCell is transmitted in a same UL TTI of the TDD PCell).

For an FDD SCell, a PUSCH can be transmitted in every TTI (unlike for a TDD PCell where a PUSCH can be transmitted only if a TTI is an UL TTI according to Table 2). This allows multiplexing in a PUSCH transmitted in an FDD SCell for any HARQ-ACK information pending transmission. However, this can complicate HARQ-ACK transmission from the UE 114 and reception by the eNB 102. For example, if HARQ-ACK information pending transmission is multiplexed in a PUSCH transmitted in a FDD SCell in a TTI prior to an UL TTI where a respective PUCCH transmission conveying the HARQ-ACK information is to occur in the TDD PCell, for example according to Table 4, the HARQ-ACK information pending transmission may either not be included in the PUCCH transmission or can be duplicated in both the PUSCH transmission and the PUCCH transmission. For this reason, the UE 114 may not multiplex any available HARQ-ACK information in a PUSCH unless the PUSCH is transmitted in a TTI that supports transmission of HARQ-ACK information in the TDD PCell, for example as in Table 2 or as in Table 4. It is noted that if the UE 114 is configured for PUSCH and PUCCH transmissions in a same UL TTI, the UE 114 can also be configured to transmit HARQ-ACK in a PUCCH.

Figure 16:
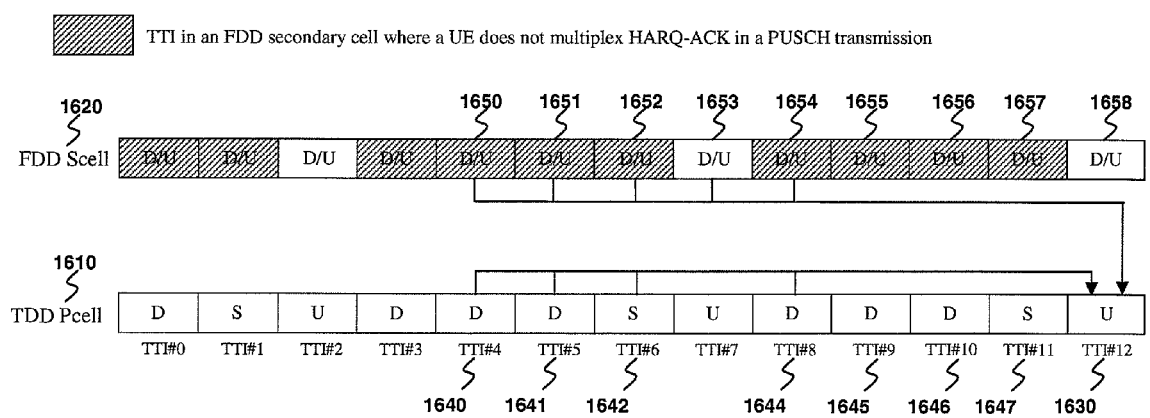
FIG. 16 illustrates an example method for determining whether a UE multiplexes available HARQ-ACK information in a PUSCH transmission in a FDD SCell according to this disclosure.

FIG. 16 illustrates an example method for determining whether a UE multiplexes available HARQ-ACK information in a PUSCH transmission in a FDD SCell according to this disclosure. The embodiment of the determination shown in FIG. 16 is for illustration only. Other embodiments could be used without departing from the scope of the present disclosure.

Referring to FIG. 16, the UE 114 is configured with a TDD PCell 1610 and with a FDD SCell 1620. The UE 114 transmits HARQ-ACK information in the TDD PCell in UL TTI#12 1630. If the UE 114 transmits PUSCH in the FDD SCell in TTI#8 1654 and the UE 114 has detected a DL DCI format for the TDD PCell in TTI#4 either for the TDD PCell 1640 or for the FDD SCell 1650, a respective HARQ-ACK information is available for the UE 114 to multiplex in the PUSCH. However, as the UE 114 does not transmit HARQ-ACK information in the TDD PCell in TTI#8 1654 (TTI#8 is a DL TTI in the TDD PCell), the UE 114 does not multiplex the available HARQ-ACK information in the PUSCH it transmits in the FDD SCell in TTI#8 1654. Similar, if the UE 114 transmits PUSCH in the FDD SCell in TTI#9 1655 and the UE 114 has detected a DL DCI format for the TDD PCell in TTI#4 or in TTI#5 either for the TDD PCell 1640 or 1641 or for the FDD SCell 1650 or 1651, respectively, the UE 114 does not multiplex the available HARQ-ACK information in the PUSCH it transmits in the FDD SCell in TTI#9 1655 as that TTI is a DL TTI in the TDD PCell. Similar, the UE 114 does not multiplex available HARQ-ACK information in a PUSCH the UE 114 transmits in TTI#10 1656 or in TTI#11 1657 in the FDD SCell. However, the UE 114 does multiplex available HARQ-ACK information in a PUSCH the UE 114 transmits in TTI#12 1658 in the FDD SCell as this TTI is an UL TTI 1630 where the UE 114 can transmit HARQ-ACK in the TDD PCell.

As previously described, in case an UL DCI format is for a FDD SCell, the UE 114 multiplexes HARQ-ACK information in a respective PUSCH only if the PUSCH is transmitted in a TTI that is an UL TTI in the TDD PCell; otherwise, the UE 114 does not multiplex HARQ-ACK information in the PUSCH. Considering this TTI-based limitation for multiplexing HARQ-ACK information in a PUSCH the UE 114 transmits in a FDD SCell (for a TDD PCell), a DAI field does not need to convey any information when the DAI field is included in an UL DCI format scheduling a PUSCH in a FDD SCell in a TTI that is not a TTI where the UE 114 can transmit HARQ-ACK information in a TDD PCell. In that case, two alternatives exist. Either a DAI field in not included in an UL DCI format scheduling a PUSCH transmission in a FDD SCell (when the PUSCH is transmitted in a TTI that is not a TTI where a UE 114 can transmit HARQ-ACK information in a PUCCH in a TDD PCell) or a DAI field can be set by the eNB 102 to a predetermined value (such as for example, a '00' value indicating no HARQ-ACK multiplexing in the PUSCH that can also be used by the UE 114 in validating the detected UL DCI format).

Figure 17:
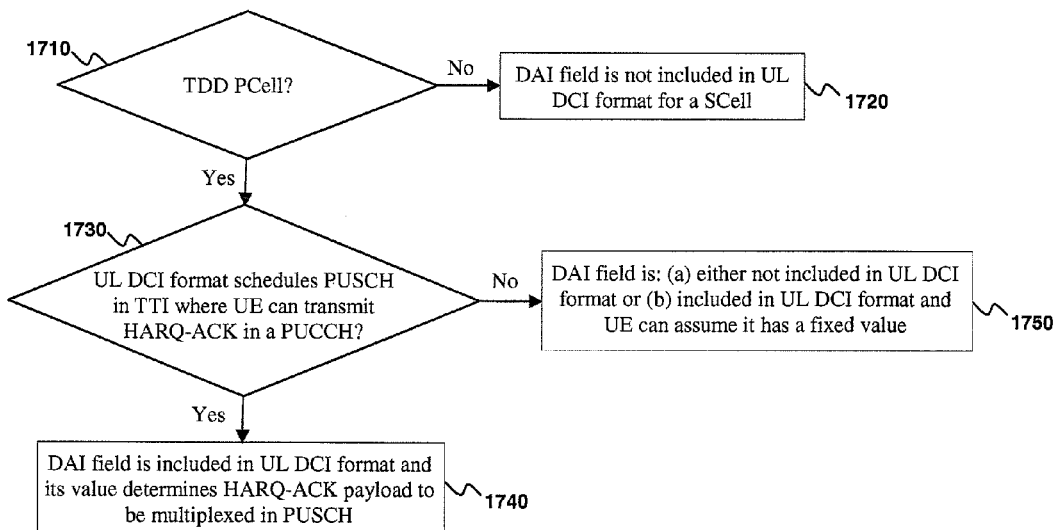
FIG. 17 illustrates an example method for determining a use of a DAI field in an UL DCI format scheduling a PUSCH transmission in an FDD SCell according to this disclosure.

FIG. 17 illustrates an example method for determining a use of a DAI field in an UL DCI format scheduling a PUSCH transmission in an FDD SCell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 17, depending upon a type of a PCell for the UE 114 in operation 1710, a DAI field is not included in an UL DCI format for scheduling PUSCH in a SCell if the PCell is an FDD one in operation 1720. If the PCell is a TDD one, an existence or a value of a DAI field in an UL DCI format for a SCell can depend on whether a respective PUSCH transmission from the UE 114 is scheduled in a where the UE 114 can transmit HARQ-ACK in the TDD PCell 1730. If the UE 114 transmits PUSCH in a TTI where the UE 114 can transmit HARQ-ACK in the TDD PCell, a DAI field is included in an UL DCI format scheduling the PUSCH transmission and the UE 114 determines the HARQ-ACK payload to multiplex in the PUSCH based on the value of the DAI field 1740. If the UE 114 transmits PUSCH in a TTI where the UE 114 cannot transmit HARQ-ACK in the TDD PCell, the UE 114 does not multiplex any available non-transmitted HARQ-ACK information in the PUSCH. Then, a DAI field is either not included in the UL DCI format scheduling the PUSCH transmission or the UE 114 can assume that the DAI field has a fixed value 1750 such as a value '00' (indicating no HARQ-ACK multiplexing in the PUSCH).

Upon detection of an UL DCI format that includes a DAI field with a value of $W_{DAI}^{UL}$ and schedules a PUSCH in the TDD PCell or a FDD SCell in a TTI where the UE 114 can multiplex HARQ-ACK information in a PUCCH then, if $M_{FDD} \leq 4$ (this also implies that the TDD PCell does not use TDD UL-DL configuration 5 in Table 1), the UE 114 multiplexes in the PUSCH $O_{TDD} \cdot \min(W_{DAI}^{UL}, M_{TDD})$ HARQ-ACK information bits for the TDD PCell and $O_{FDD} \cdot \min(W_{DAI}^{UL}, M_{FDD})$ for the FDD SCell ($O_{TDD}$ or $O_{FDD}$ is equal to one or two depending on a respective configured PDSCH TM). If the TDD PCell does not use TDD UL-DL configuration 5 in Table 1 and if $M_{FDD} > 4$, the UE 114 multiplexes in the PUSCH $O_{TDD} \cdot \min(W_{DAI}^{UL}, M_{TDD})$ HARQ-ACK information bits for the TDD PCell and $O_{FDD} \cdot \min(W_{DAI}^{UL}+4\lceil(U-W_{DAI}^{UL})/4\rceil, M_{FDD})$ for the FDD SCell, where U is the number of DL DCI formats the UE 114 detects for scheduling PDSCH in the FDD SCell. If the TDD PCell uses TDD UL-DL configuration 5 (then it is also $M_{FDD} > 4$), the UE 114 multiplexes in the PUSCH $O_{TDD} \cdot \min(W_{DAI}^{UL}+4\lceil(U-W_{DAI}^{UL})/4\rceil, M_{TDD})$ HARQ-ACK information bits for the TDD PCell and $O_{FDD} \cdot \min(W_{DAI}^{UL}+4\lceil(U-W_{DAI}^{UL})/4\rceil, M_{FDD})$ for the FDD SCell where U is the larger number between a number of DL DCI formats the UE 114 detects for the TDD PCell and a number of DL DCI formats the UE 114 detects for the FDD SCell. The UE 114 can determine an association between a DL TTI and a respective HARQ-ACK information from a value of a DAI field in each detected DL DCI format, for example, as described in REF 3.

Alternatively, as $M_{FDD} \geq M_{TDD}$ the UE 114 multiplexes in a PUSCH HARQ-ACK bits for a same number of $N_{PDSCH}$ PDSCH receptions (or SPS PDSCH release reception) in a TDD PCell and in a FDD SCell where $N_{PDSCH}$ is determined according to $M_{FDD}$ as it was described in the previous paragraph, that is $N_{PDSCH} = \min(W_{DAI}^{UL}, M_{FDD})$ if $M_{FDD} \leq 4$ and $N_{PDSCH} \min(W_{DAI}^{UL}+4\lceil(U-W_{DAI}^{UL})/4\rceil, M_{FDD})$ if $M_{FDD} > 4$. If $N_{PDSCH} > M_{TDD}$ the additional $O_{TDD} \cdot (N_{PDSCH} - M_{TDD})$ HARQ-ACK information bits for the TDD PCell can be set to a predetermined value, such as the NACK/DTX value.

For SPS PUSCH or for a PUSCH retransmission that is triggered by a negative acknowledgement signal transmission from an eNB and not by an UL DCI format, the UE 114 multiplexes in the PUSCH $O_{TDD} \cdot M_{TDD}$ HARQ-ACK information bits for the TDD PCell and HARQ-ACK information bits for the FDD SCell. Alternatively, the UE 114 multiplexes $O_{TDD} \cdot M_{FDD}$ HARQ-ACK information bits for the TDD PCell and $O_{FDD} \cdot M_{FDD}$ HARQ-ACK information bits for the FDD SCell.

Transmission of HARQ-ACK Information in a PUCCH Either in a TDD PCell or in a FDD SCell In certain embodiments, PUCCH transmission in a SCell can be configured to the UE 114 configured with aggregation of multiple cells. In case of a TDD PCell and a FDD SCell, and for functionalities associated with HARQ-ACK transmission from the UE 114, if a PUCCH for HARQ-ACK transmission is in the FDD SCell, a respective scope for a DL HARQ process number field, a DAI field, and an ARO field in a DL DCI format and for a DAI field or an UL index field in an UL DCI format, for either a TDD PCell or a FDD SCell, can be redefined.

The UE 114 can establish initial connection with a TDD cell and can be subsequently configured by the eNB 102 for additional communication with a FDD SCell. For example, due to spectrum availability or due existing deployments, a TDD PCell can use a first frequency and support transmission of UE-common DL control signaling while an FDD SCell may use a second frequency and due to interference or signal propagation conditions may not support UE-common DL control signaling.

If the UE 114 with a TDD PCell and a FDD SCell is configured to transmit HARQ-ACK information at least for PDSCH receptions in the FDD SCell in a PUCCH in the FDD SCell then, for the purpose of transmitting HARQ-ACK information from the UE 114, the operation is same as if the FDD SCell was a FDD PCell and the TDD PCell was a TDD SCell. Then, as was previously described, if HARQ-ACK information for PDSCH receptions in a TDD cell is transmitted in a FDD cell, a DL HARQ process number field in a DL DCI format for the TDD PCell can be reduced from 4 bits to 3 bits, a DAI field in a DL DCI format for the TDD PCell can be removed, a mapping of a ARO field can be redefined, and a DAI field in an UL DCI format for the TDD PCell can be also removed. Moreover, no change is required in a DL DCI format or an UL DCI format for the FDD SCell relative to the case of FDD single-cell operation (a DAI field is not introduced in a respective DL DCI format or an UL DCI format and a number of bits for a DL HARQ process number field is not increased).

Figure 18:
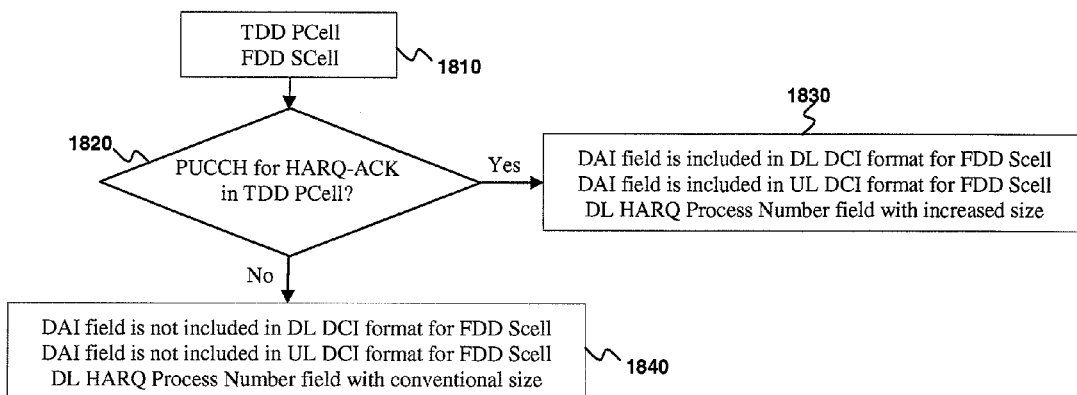
FIG. 18 illustrates an example method for determining a use of a DAI field in an UL DCI format scheduling a PUSCH transmission in a FDD SCell according to this disclosure.

FIG. 18 illustrates an example method for determining a use of a DAI field in an UL DCI format scheduling a PUSCH transmission in a FDD SCell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 18, the UE 114 is configured with a TDD PCell and a FDD SCell in operation 1810. For a TDD cell, a conventional DL DCI format includes a DAI field and a DL HARQ process number field of 4 bits and a conventional UL DCI format includes a DAI field. For an FDD cell, a conventional DL DCI format does not include a DAI field and includes a DL HARQ process number field of 3 bits and a conventional UL DCI format does not include a DAI field. If the UE 114 transmits HARQ-ACK in a PUCCH in the TDD PCell in operation 1820, a DL DCI format for the FDD SCell is modified to include a DAI field and a DL HARQ process number field of 4 bits and an UL DCI format for the FDD SCell is modified to include a DAI field in operation 1830. Otherwise, if the UE 114 does not transmit HARQ-ACK in a PUCCH in the TDD PCell (and instead transmits PUCCH in the FDD SCell), a DL DCI format for the FDD SCell is not modified to include a DAI field or to include a DL HARQ process number field of 4 bits and an UL DCI format for the FDD SCell is not modified to include a DAI field in operation 1840.

In general, if the UE 114 transmits HARQ-ACK information corresponding to one or more PDSCH receptions in a TDD cell in a PUCCH of a FDD cell, a DL DCI format scheduling PDSCH on the TDD cell does not include a DAI field and includes a DL HARQ process number field of 3 bits (instead of 4 bits) and an UL DCI format scheduling PUSCH on the TDD cell does not include a DAI field. Conversely, if the UE 114 transmits HARQ-ACK information corresponding to one or more PDSCH receptions in a FDD cell in a PUCCH of a TDD cell, a DL DCI format scheduling PDSCH on the FDD cell includes a DAI field and includes a DL HARQ process number field of 4 bits (instead of 3 bits) and an UL DCI format scheduling PUSCH on the TDD cell includes a DAI field.

In order to improve a robust system operation that can allow the UE 114 to lose connection with an FDD SCell while maintaining connection with a TDD PCell, the UE 114 may not transmit HARQ-ACK information in a PUCCH of a FDD SCell in a that is an UL TTI in the TDD PCell. Instead, in a TTI that is an UL TTI in the TDD PCell, the UE 114 may transmit HARQ-ACK information in a PUCCH of the TDD PCell. The UE 114 may still transmit HARQ-ACK information in a PUCCH of a FDD SCell in a TTI that is not an UL in the TDD PCell.

Cross-carrier Scheduling from a FDD Cell to a TDD Cell

In certain embodiments, a DCI format from a FDD cell, such as a PCell, can be transmitted in any TTI to schedule to the UE 114 either PDSCH reception in a same TTI or PUSCH transmission after 4 TTIs in a FDD cell or in a first UL TTI after at least 4 TTIs in a TDD cell. For a TDD cell that is cross-scheduled from a FDD cell, PDSCH reception in a same TTI as a TTI of a respective DCI format transmission in a FDD cell is not possible if the TTI in the TDD cell is not a DL one.

In a first approach, the eNB 102 does not transmit and the UE 114 does not decode in a TTI of a FDD cell a DL DCI format for PDSCH scheduling in a TDD cell if the TTI is an UL TTI in the TDD cell. In general, for scheduling of a TDD second cell from a (BUD or TDD) first cell, the eNB 102 does not transmit and the UE 114 does not decode in a TTI of the first cell a DCI format for PDSCH scheduling in the second cell if the TTI is an UL TTI in the second cell. Similar, if TTI n+4 is a DL TTI in a TDD cell then, in TTI n, the eNB 102 does not transmit and the UE 114 does not decode in a FDD cell any UL DCI format for PUSCH transmission in the TDD cell. For example, the UE 114 can allocate the available decoding operations from not decoding previous DL DCI formats or UL DCI formats to increase a number of decoding operations it performs for scheduling in other cells or, respectively, for UL DCI formats or DL DCI formats for scheduling in the TDD cell.

Figure 19:
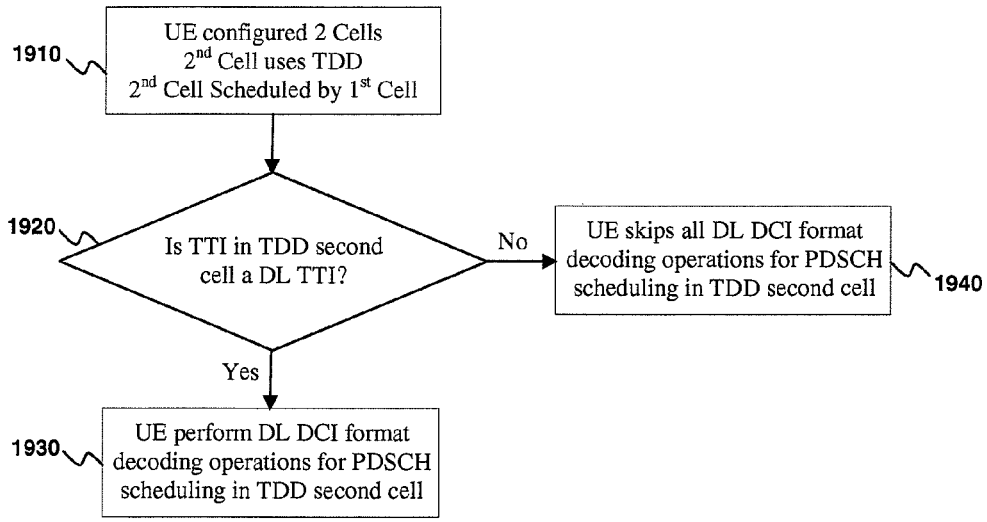
FIG. 19 illustrates an example UE decoding operation in a TTI for a DL DCI format scheduling a PDSCH in a TDD cell when the TTI is an UL TTI in the TDD cell according to this disclosure.

FIG. 19 illustrates an example UE decoding operation in a TTI for a DL DCI format scheduling a PDSCH in a TDD cell when the TTI is an UL TTI in the TDD cell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 19, the UE 114 is configured by the eNB 102 for PDSCH receptions in two cells wherein a second cell uses TDD and a PDSCH reception in either cell is scheduled by a PDCCH transmitted in a first cell and conveying a respective DL DCI format in operation 1910. In a DL TTI of the first cell, the UE 114 considers a communication direction of the TTI in the TDD second cell in operation 1920. If the TTI is a DL one, the UE 114 performs decoding operations to detect a PDCCH conveying a DL DCI format for PDSCH reception in the TDD second cell in operation 1930. If the TTI is an UL one, the UE 114 skips all decoding operations for PDCCHs associated with a transmission of a DL DCI format for PDSCH reception in the TDD second cell in operation 1940.

There are two options for using the above limitations to improve an overall system operation. A first option is to use a number of decoding operations becoming available when the UE 114 does not decode aforementioned DCI formats for increasing a number of decoding operations for DCI formats the UE 114 actually decodes in a TTI. For example, if the UE 114 performs 16 decoding operations for DL DCI formats and 16 decoding operations for UL DCI formats per TTI in a UE-specific search space and per cell then, in a TTI where the UE 114 does not decode DL DCI formats for a TDD cell, the UE 114 can use the respective 16 decoding operations to increase a number of decoding operations it performs for DL DCI formats for an FDD cell or for UL DCI formats for an FDD cell or for the TDD cell. This can be useful if a Common Search Space (CSS) for PDCCH transmissions is supported in both a first cell and a second cell and the UE 114 has a nominal PDCCH decoding capability to support PDCCH decoding operation in only one CSS.

Figure 20:
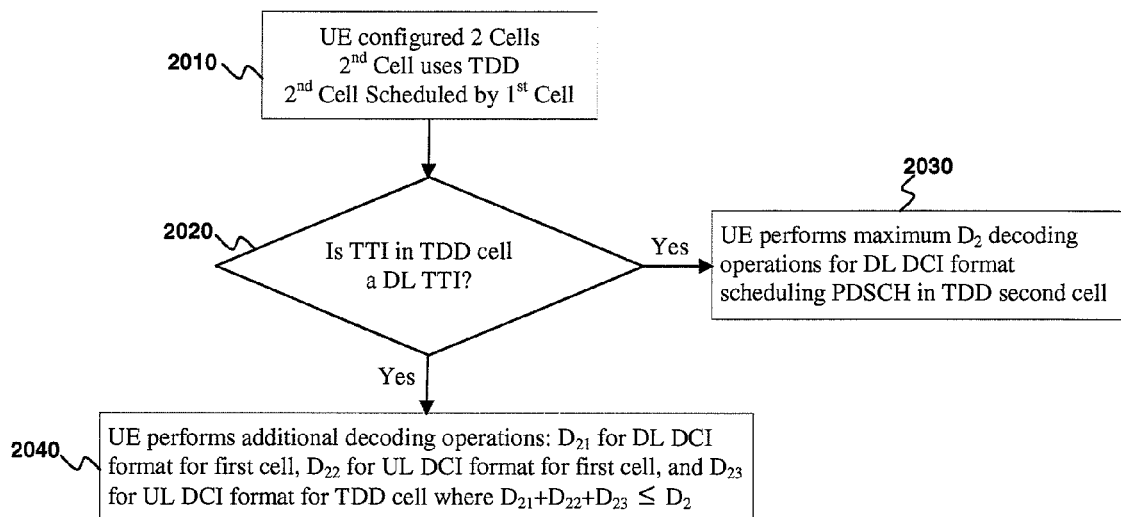
FIG. 20 illustrates an example allocation of decoding operations at a UE for PDCCHs transmitted in a first cell in a TTI depending on whether the UE monitors a DL DCI format for a TDD cell in the TTI according to this disclosure.

FIG. 20 illustrates an example allocation of decoding operations at a UE for PDCCHs transmitted in a first cell in a TTI depending on whether the UE monitors a DL DCI format for a TDD cell in the TTI according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

As shown in FIG. 20, the UE 114 is configured for PDSCH receptions in two cells wherein a SCell uses TDD and a PDSCH reception in either cell is scheduled by a PDCCH transmitted in a first cell in operation 2010. The UE 114 is configured with a PDSCH TM and a PUSCH TM in each cell and can perform a number of $D_2$ decoding operations for a respective DL DCI format in the TDD cell. In a DL TTI of the first cell, the UE 114 considers a communication direction of the TTI in the TDD cell in operation 2020. If the TTI is a DL one, the UE 114 performs a maximum of $D_2$ decoding operations for a DL DCI format scheduling PDSCH in the TDD cell in operation 2030 or for a CSS in the TDD cell. If the FYI is an UL one, the UE 114 does not perform any decoding operation for a DL DCI format scheduling PDSCH in the TDD cell and performs $D_{21}$ additional decoding operations for a DL DCI format scheduling PDSCH in the first cell, $D_{22}$ additional decoding operations for a UL DCI format scheduling PUSCH in the first cell, and $D_{23}$ additional decoding operations for a UL DCI format scheduling PUSCH in the TDD cell, where $D_{21}+D_{22}+D_{23} \leq D_2$ in operation 2040.

A second option for the first approach is for the UE 114 to support only half a number of decoding operations for a cross-carrier scheduled TDD cell compared to a number of decoding operations for a FDD cell or for a TDD single-cell operation. For example, the UE 114 can perform 16 decoding operations for DL DCI formats and 16 decoding operations for UL DCI formats per TTI either for a FDD cell, or for a TDD PCell, or for a TDD single-cell operation but can perform only 16 decoding operations, either for DL DCI formats or for UL DCI formats, for a cross-carrier scheduled TDD cell.

Figure 21:
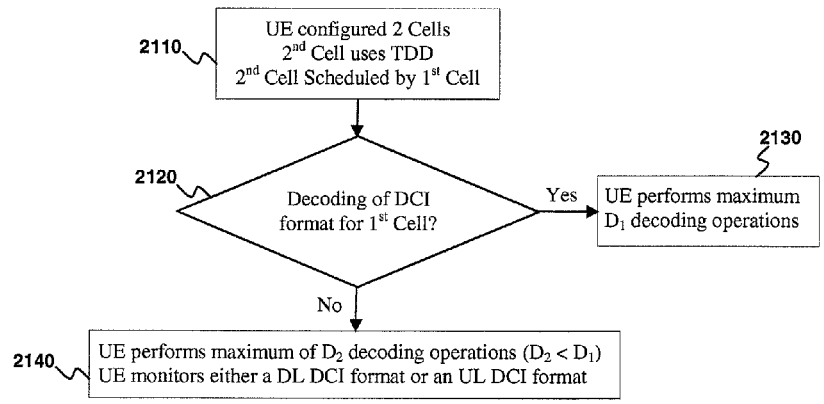
FIG. 21 illustrates an example allocation of decoding operations at a UE for PDCCHs transmitted in a first cell for scheduling in the first cell and in a TDD second cell according to this disclosure.

FIG. 21 illustrates an example allocation of decoding operations at a UE for PDCCHs transmitted in a first cell for scheduling in the first cell and in a TDD second cell according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

Referring to FIG. 21, the UE 114 is configured for PDSCH receptions in two cells wherein a second cell uses TDD and a PDSCH reception in either cell is scheduled by a PDCCH transmitted in a first cell in operation 2110. For detections of DCI formats scheduling PDSCH or PUSCH in the first cell in operation 2120, the UE 114 performs a total maximum of $D_1$ decoding operations in operation 2130. For detections of DCI formats scheduling PDSCH or PUSCH in the TDD second cell, the UE 114 performs a total maximum of $D_2$ decoding operations wherein $D_2<D_1$ and the UE 114 monitors either a DL DCI format or an UL DCI format (not both) in a TTI in operation 2140.

In a second approach, the eNB 102 transmits and the UE 114 decodes in a FDD cell DCI formats for PDSCH scheduling in a TTI that is an UL TTI in a TDD SCell. Also, if TTI n+4 is an UL TTI in a TDD SCell then, in TTI n, the eNB 102 transmits and the UE 114 decodes in a FDD cell DCI formats for PUSCH transmission in the TDD SCell. For determining a TTI of a PUSCH transmission, a same timeline can apply as for self-scheduling in the FDD cell. For example, a TTI for a PUSCH transmission in response to an UL DCI format detection can be a first UL TTI after 4 TTIs from a TTI of a respective UL DCI format detection. Alternatively, an existing timeline for single-cell TDD operation, with a same TDD UL-DL configuration, can apply for the DCI formats transmitted in the FDD cell and schedule PDSCH or PUSCH in the TDD SCell.

For determining a TTI for a PDSCH reception, a new scheduling timeline can also be beneficial as in all other cases a TTI of PDSCH reception is same as the TTI of a respective DL DCI format detection. For a TDD SCell that is cross-carrier scheduled a PDSCH reception from a FDD cell through a DCI format in a TTI that is an UL TTI in the TDD SCell, a TTI for the PDSCH reception can be the first DL TTI after the UL TTI. A motivation use a new timeline, and for the eNB 102 to transmit a DL DCI format to the UE 114 for PDSCH scheduling in a TDD SCell when a respective TTI in an UL one, is to utilize available PDCCH resources that would otherwise not be used for any signal transmission and possibly use fewer PDCCH resources in a later TTI for PDSCH scheduling in the TDD SCell.

Figure 22:
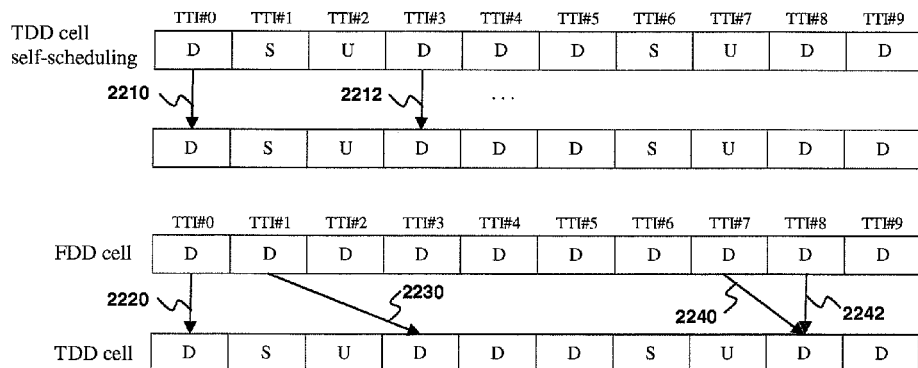
FIG. 22 illustrates an example PDSCH scheduling for a TDD single-cell operation and for a cross-scheduled TDD SCell according to this disclosure.

FIG. 22 illustrates an example PDSCH scheduling for a IUD single-cell operation and for a cross-scheduled TDD SCell according to this disclosure. The embodiment of the PDSCH scheduling shown in FIG. 22 is for illustration only. Other embodiments could be used without departing from the scope of the present disclosure.

As shown in FIG. 22, for a single cell TDD operation, the UE 114 always receives a PDSCH in a same TTI as the TTI of a PDCCH reception conveying a respective DL DCI format 2210, 2212. For cross-carrier scheduled TDD SCell operation, the UE 114 receives a PDSCH in a same TTI as the TTI of a PDCCH reception conveying a respective DL DCI format if the TTI is a DL TTI in the TDD SCell in operation 2220. For cross-carrier scheduled TDD SCell operation, the UE 114 receives a PDSCH in a first DL after the TTI of a PDCCH reception conveying a respective DL DCI format if the TTI is an UL TTI or a special ITT in the TDD SCell in operation 2230. To avoid an error case where the UE 114 can receive more DL DCI formats than DL Hs over a time period, the UE 114 can only consider a most recent DCI format for a PDSCH reception. Therefore, if the UE 114 detects a DL DCI format in TTI#7 2240 and a DL DCI format in TTI#8 2242, the UE 114 disregards the DL DCI format in TTI#7 and receives a PDSCH in accordance to the DL DCI format in TTI#8 (unless one DL DCI format triggers an SPS release and the other DL DCI format schedules a PDSCH reception; then, the UE considers both DL DCI formats).

Cross-carrier Scheduling from a TDD Cell to a FDD Cell

In certain embodiments, it is desirable to schedule a PDSCH or PUSCH transmission in a SCell using a respective DCI format conveyed by a PDCCH transmitted in a different cell. For PDSCH or PUSCH scheduling by a respective DCI format transmitted in a PDCCH in a TDD cell, a scheduling capability is limited only in DL TTIs. For single-cell TDD operation and TDD UL-DL configuration 0 having more UL TTIs than DL TTIs, a limitation of scheduling in all UL TTIs is circumvented by including an UL index field in an UL DCI format. The UL index field indicates one or more UL TTIs for PUSCH transmission scheduled by a respective UL DCI format.

A similar scheduling limitation as for a conventional single-cell TDD operation occurs when a TDD PCell performs cross-carrier scheduling to a FDD SCell and is applicable to all TDD DL-UL configurations and to both PDSCH scheduling and PUSCH scheduling as a number of DL TTIs in a TDD PCell is always smaller than a number of DL TTIs in a FDD SCell. Therefore, a DL index field or an UL index field can be introduced in a respective DL DCI format or UL DCI format for respective scheduling in a FDD SCell from a TDD PCell in order to respectively allow PDSCH or PUSCH scheduling in multiple TTIs from a single DL in the TDD PCell. Such a DL index field or UL index field for any TDD UL-DL configuration, other than TDD UL-DL configuration 0, does not need to be introduced in a respective DL DCI format or UL DCI format for respective scheduling in the TDD PCell. Therefore, a DL index field or an UL index field is needed only if PDSCH or PUSCH scheduling in the FDD SCell can be in multiple TTIs; otherwise, if PDSCH or PUSCH scheduling in the FDD SCell is restricted to a single respective TTI, a DL index field or an UL index field is not needed in a respective DL DCI format or UL DCI format.

For scheduling of PDSCH transmissions in multiple respective TTIs of a FDD SCell from a TDD PCell using a single DL DCI format, a first restriction is that the DL DCI format is transmitted in a DL TTI of a same bundling window as the TTIs of the multiple PDSCH transmissions (which all are assumed to be in the same bundling window). This avoids confusion in an interpretation of a DAI field in the DL DCI format (in case the UE 114 transmits HARQ-ACK information in the TDD PCell, as was previously described) and enables HARQ-ACK information for a same bundling window to be transmitted in a same PUCCH or PUSCH. For example, if TDD UL-DL configuration 2 is used in the TDD PCell, a PDSCH transmission in TTI#7 in the FDD SCell can only be scheduled by a DL DCI format transmitted in DL TTI#4, DL TTI#5, or DL TTI#6 in the TDD PCell.

To further simplify scheduling of a PDSCH transmission in a first DL TTI of a FDD SCell from a DL DCI format transmitted in a second TTI of a TDD PCell, when using a DL index in a respective DL DCI format, such scheduling can be limited only to single-TTI scheduling and only for TTIs that are UL TTIs in a TDD PCell. For example, if TDD UL-DL configuration 2 is used in the TDD PCell, a DL DCI format always schedules PDSCH in a single DL TTI and a PDSCH transmission only for TTI#7 in the FDD SCell can be scheduled by a DL DCI format transmitted in the TDD PCell while a PDSCH transmission in any other TTI in a same bundling window for the FDD SCell, such as TTI#6, is scheduled by a DL DCI format transmitted in a same TTI in the TDD PCell. As for the TDD UL-DL configurations in Table 1 there are at most 3 UL TTIs in a same bundling window for a FDD SCell then, using the previous restrictions, a DL index in a DL DCI format can include 2 bits which can indicate a TTI in the FDD SCell where the DL DCI format schedules a respective PDSCH transmission.

For example, if TDD UL-DL configuration 2 is used in the TDD PCell, a DL index value of '00' can indicate that a respective DL DCI format schedules a PDSCH in the FDD SCell in the same TTI as the TTI where the DL DCI format is transmitted while a DL index value of '01' can indicate PDSCH scheduling in TTI#7. In this case, the UE 114 can consider the other two possible values of the DL index, '10' and '11', as invalid and can disregard a detection of an associated DL DCI format (alternatively, a 1-bit DL index can be used in this case). For example, if TDD UL-DL configuration 0 is used in the TDD PCell, a DL index value of '00' can indicate that a respective DL DCI format schedules a PDSCH in the FDD SCell in the same TTI as the TTI where the DL DCI format is transmitted, such as TTI#5 or TTI#6, while a DL index value of '01', '10', or '11' can indicate, respectively, PDSCH scheduling in TTI#7, TTI#8, or TTI#9.

In case of cross-TTI scheduling, ordering of HARQ-ACK information bits follows the scheduling order rather than the TTI order. For example, a scheduling order can be determined by a value of a DAI field included in each DL DCI format scheduling a respective PDSCH transmission. Therefore, it is possible for a PDSCH transmission scheduled by cross-III scheduling to have first HARQ-ACK information bits ordered prior to second HARQ-ACK information bits corresponding to an earlier PDSCH transmission in a same bundling window even though the first HARQ-ACK information bits become available at the UE 114 after the second HARQ-ACK information bits. For example, if TDD UL-DL configuration 2 is used in the TDD PCell, a PDSCH transmission in TTI#7 in the FDD SCell can be cross-TTI scheduled by a DCI format transmitted in DL TTI#4 in the TDD PCell. Then, if a PDSCH transmission in the FDD SCell is scheduled in any of TTI#5, TTI#6, or TTI#8, respective HARQ-ACK information bits are placed after ones corresponding to PDSCH transmission in TTI#7.

Figure 23:
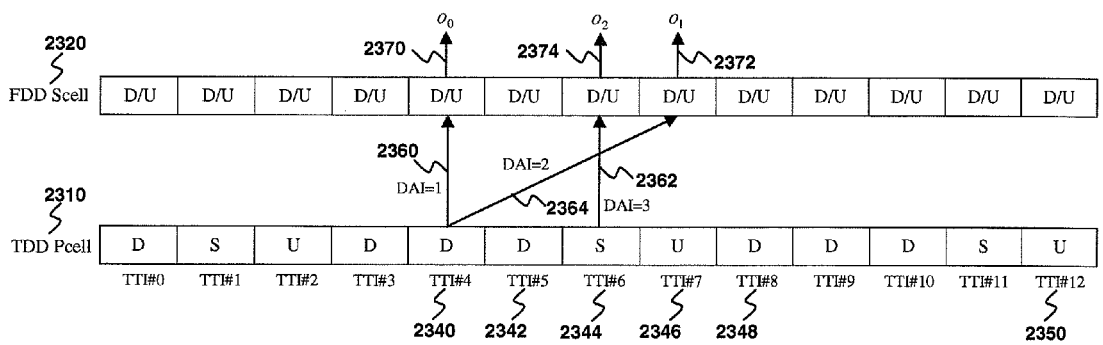
FIG. 23 illustrates an example method for scheduling a PDSCH in a TTI in an FDD SCell by a DL DCI format transmitted in an earlier TTI in a TDD PCell and for generating respective HARQ-ACK information bits according to this disclosure.

FIG. 23 illustrates an example method for scheduling a PDSCH in a TTI in an FDD SCell by a DL DCI format transmitted in an earlier TTI in a TDD PCell and for generating respective HARQ-ACK information bits according to this disclosure. The embodiment of the PDSCH scheduling shown in FIG. 23 is for illustration only. Other embodiments could be used without departing from the scope of the present disclosure.

As shown in FIG. 23, the UE 114 is configured with a TDD PCell 2310 and with a FDD SCell 2320. The TDD PCell, on in general a TDD scheduling cell, uses TDD UL-DL configuration 2 and a PDSCH in the FDD SCell is scheduled by a DL DCI format transmitted in the TDD PCell (or, in general, in a TDD scheduling cell). For the FDD SCell, TTI#4 2340, TTI#5 2342, TTI#6 2344, TTI#7 2346, and TTI#8 2348 belong in a same bundling window and HARQ-ACK information in response to a DL DCI format detection for the FDD SCell in any of these TTIs is transmitted in UL TTI#12 2350. A first DL DCI format for the FDD SCell and for TTI#4 is transmitted in TTI#4 in the TDD PCell and includes a DAI field mapping to a value of 1 and a DL index field mapping to a value of 0 2360. A second DL DCI format for the FDD SCell and for TTI#7 is transmitted in TTI#4 in the TDD PCell and includes a DAI field mapping to a value of 2 and a DL index field mapping to a value of 1 2362. Although the second DL DCI format includes a DL index field mapping to a value of 1, due to a restriction of not performing cross-TTI scheduling in a TTI that is a DL TTI in the TDD PCell, it is unambiguous that the second DL DCI format is for TTI#7 in the FDD SCell. A third DL DCI format for the FDD SCell and for TTI#6 is transmitted in TTI#6 in the TDD PCell and includes a DAI field mapping to a value of 3 and a DL index field mapping to a value of 0 2364(the UE 114 may disregard the third DL DCI format if the mapping of the DL index field is not to a value of 0). In response to a detection of one or more of the first, second, and third DL DCI formats, the UE 114 generates at least respective HARQ-ACK information bits $o_0$ 2370, $o_1$ 2372, and $o_2$ 2374 and transmits them in that order even though $o_1$ is generated at the UE after $o_2$ (for simplicity, the example shown in FIG. 23 assumes that a PDSCH TM is associated with one HARQ-ACK bit; however, if a PDSCH TM is associated with two HARQ-ACK information bits, a same ordering applies for each pair of HARQ-ACK information bits).

New TDD UL-DL Configurations

In certain embodiments, if a TDD SCell does not support conventional UEs, new TDD UL-DL configurations can be introduced to exploit characteristics of CA between FDD and TDD cells having a FDD PCell. Such a TDD UL-DL configuration can be one that includes only DL TTIs. These new TDD UL-DL configurations can be enabled by having PUCCH transmissions always occur in the FDD PCell and is further motivated from a typical system operation having more DL traffic than UL traffic. A TDD cell with only DL TTIs is functionally same as a FDD cell with an UL carrier shared with another FDD cell with an exception being that a respective carrier frequency is in a spectrum otherwise allocated for TDD operation.

As, due to channel reciprocity, SRS transmissions can be beneficial in a TDD cell for obtaining DL CSI, a TDD SCell may not include UL TTIs but can still include special TTIs, possibly with few or none DL symbols and as many as possible UL symbols that can be used for PRACH transmissions and SRS transmissions. It is noted that due to different interference conditions that the UE 114 can experience for DL signal reception and UL signal transmissions, CQI can also be explicitly provided by the UE 114 even though the eNB 102 can obtain other CSI types through an SRS transmission from the UE 114. Therefore, another new type of TDD UL-DL configuration can include only DL TTIs and or only DL TTI Hs and a special TTI.

FIG. 24 illustrates an example TDD UL-DL configuration with DL TTIs, one special TTI, and no UL TTIs according to this disclosure. The embodiment of the TDD UL-DL configuration shown in FIG. 24 is for illustration only. Other embodiments could be used without departing from the scope of the present disclosure.

As shown in FIG. 24, a frame of ten TTIs includes one special ITT 2410 and all remaining TTIs are DL TTIs 2420. The special TTI can also be of a new type and include no DwPTS symbols, a GP, and an increased number of UpPTS symbols. The UpPTS symbols can be used for SRS transmissions and, for example in case a respective TDD SCell is not synchronized with a FDD PCell, for PRACH transmissions.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method comprising:
    transmitting, by a base station to a User Equipment (UE)
        communicating with the base station through a Primary Cell (PCell) using either Frequency Division Duplexing (FDD) or Time Division Duplexing (TDD),
        configuration information for communication with a Secondary Cell (SCell), wherein
            the SCell uses TDD if the PCell uses FDD, and
            the SCell uses FDD and if the PCell uses TDD,
        signaling indicating a TDD UpLink-DownLink (UL-DL) configuration for the cell using TDD, wherein a TDD UL-DL configuration is defined over a time period of ten Transmission Time Intervals (TTIs) that comprise DL TTIs where a communication direction is from the base station to the UE, UL TTIs where a communication direction is from the UE to the base station, and special TTIs where a communication direction can be both from the base station to the UE and from the UE to the base station, and wherein each TTI of the ten TTIs has a unique time domain index,
        one or more Physical DL Control CHannels (PDCCHs) conveying respective one or more DL control information (DCI) formats, wherein each of the one or more DCI formats schedules to the UE a Physical DL Shared CHannel (PDSCH) transmission or a Semi-Persistently Scheduled (SPS) PDSCH release in the PCell or a PDSCH transmission in the SCell; wherein in response to receiving the configuration information, the signaling and at least one DCI format from the one or more DCI formats, the UE determines an UL TTI in the PCell to transmit acknowledgement information, wherein:

if the PCell uses FDD, the acknowledgement information is in response to one reception of PDSCH or SPS PDSCH release in the PCell or in response to one reception of PDSCH in the SCell, in only one TTI, wherein;

if the only one TTI is not an UL TTI in the SCell, the acknowledgement information is in response to a reception of a PDSCH or SPS PDSCH release in the PCell and in a response to a reception of a PDSCH in the SCell, including no reception in either the PCell or in the SCell; and if the only one TTI is an UL TTI in the SCell, the acknowledgement information is in response only to a reception of a PDSCH or SPS PDSCH release in the PCell; and if the PCell uses TDD, the acknowledgement information is in response to at least one reception of a PDSCH or SPS PDSCH release in one of $M_{TDD}$ TTIs in the PCell or of a PDSCH in one of $M_{FDD}$ TTIs in the SCell, wherein $M_{TDD}$ or $M_{FDD}$ is a number of TTIs in the PCell or the SCell, respectively, for which acknowledgement information is transmitted in the UL TTI and $M_{TDD}$ is smaller than or equal to $M_{FDD}$.

2. The method of claim 1, wherein the PCell uses FDD and wherein at least one DCI format, from the one or more DCI formats, schedules a PDSCH transmission to the UE in the SCell and includes an Acknowledgement Resource Offset (ARO) field comprising of 2 binary elements having a mapping to numeric values that is determined as in a third table for m=0, wherein the third table comprises

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 | wherein $N_{ECCE,q,n-k_{i1}}$ is equal to a number of control channel elements (CCEs) in a set q of DL resources configured for transmission to the UE in DL TTI $n-K_{i1}$.

3. The method of claim 1, wherein the PCell uses TDD and wherein at least one DCI format, from the one or more DCI formats, schedules a PDSCH transmission to the UE in the SCell in TTI m, wherein a maximum number of TTIs for PDSCH transmissions in the SCell for which the UE transmits acknowledgment information in the UL TTI is $M_{FDD}$ and $0 \le m < M_{FDD}$, and includes an Acknowledgement Resource Offset (ARO) field comprising of 2 binary elements having a mapping to numeric values that is determined by the value of m as in a third table for $M=M_{FDD}$, wherein the third table comprises

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 | wherein $N_{ECCE,q,n-k_{i1}}$ is equal to a number of control channel elements (CCEs) in a set q of DL resources configured for transmission to the UE in DL TTI $n-k_{i1}$.

4. The method of claim 1, wherein the UL TTI for transmitting the acknowledgement information and the $M_{TDD}$ TTIs or the $M_{FDD}$ TTIs DL TTIs are determined according to a first table or according to a second table, respectively, wherein the first table comprises:

| TDD UL-DL Configuration | TTI # n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7,6 | 4 | — | — | — | 7,6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —; | and the second table comprises:

| TDD UL-DL Configuration | \_ | \_ | TTI # n | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8 | 8, 7, 6 | 6, 5,4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 7, 5 | — | 5, 4 | 8, 4 | — | — | 7, 6 | 5,4 —. |

5. The method of claim 4, wherein the PCell uses TDD with the TDD UL-DL configuration of 0.

6. The method of claim 4, wherein the PCell uses TDD with the TDD UL-DL configuration of 1.

7. The method of claim 4, wherein the PCell uses TDD with TDD UL-DL configuration of 2.

8. The method of claim 4, wherein the PCell uses TDD with the TDD UL-DL configuration of 4.

9. A method comprising:
receiving, from a base station, by a User Equipment (UE) communicating with the base station through a Primary Cell (PCell) using a Time Division Duplexing (TDD) UpLink-DownLink (UL-DL) configuration,
configuration information for communication with a Secondary Cell (SCell) using Frequency Division Duplexing (FDD), and
one or more Physical DL Control CHannel (PDCCH) conveying a respective one or more DL control information (DCI) formats scheduling to the UE respective transmissions of one or more Physical DL Shared CHannels (PDSCHs) or a Semi-Persistently Scheduled (SPS) PDSCH release, wherein each of the one or more DCI formats includes a DL Hybrid Acknowledgement Repeat reQuest (HARQ) number field comprising 4 binary elements indicating a DL HARQ process number and wherein, if the PCell uses TDD UL-DL configuration 5 from Table 1, a DL HARQ process for the SCell is restricted to be one of 16 DL HARQ processes, from a maximum of 17 DL HARQ processes; and
detecting by the UE at least one of the one or more DCI formats and receiving a respective at least one PDSCH or SPS PDSCH release, wherein Table 1 comprises

| TDD UL-DL Con-figuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D. |

10. The method of claim 9, further comprising:
receiving, by the UE, a PDCCH conveying a DCI format scheduling a Physical UL Shared CHannel (PUSCH) transmission from the UE, wherein
if the DCI format schedules a PUSCH transmission in the PCell and the PCell uses TDD UL-DL configuration 0 from Table 1, the DCI format includes an index field comprising of 2 binary elements indicating one or two UL Transmission Time Intervals (TTIs) for the PUSCH transmission,
if the DCI format schedules a PUSCH transmission in the PCell and the PCell uses a TDD UL-DL configuration from the Table 1, other than TDD UL-DL configuration 0, the DCI format includes a Downlink Assignment Index (DAI) field comprising of 2 binary elements indicating a number of DL TTIs for which, in response to transmissions of respective PDSCH or SPS PDSCH release from the base station, the UE include acknowledgement information in the PUSCH, and
if the DCI format schedules a PUSCH transmission in the SCell, the DCI format includes the DAI field and does not include the index field regardless of the TDD UL-DL configuration used in the PCell; and
in response to the UE detecting the DCI format, transmitting, by the UE the PUSCH in an UL TTI, when the DCI format includes a DAI field, or in one UL TTI or two UL TTIs, depending on a value of the index field, when the DCI format includes the index field.

11. The method of claim 10, further comprising:
generating, by the UE, acknowledgement information to transmit in the PUSCH in the UL TTI, in response to the detection of the DCI format scheduling the PUSCH transmission in the UL TTI, wherein
the DCI format includes the DAI field having a numeric value of $W_{DAI}^{UL}$,
the UE generates acknowledgement information to transmit in the UL TTI for a maximum of $M_{TDD}$ TTIs for the PCell and for a maximum of $M_{FDD}$ TTIs for the SCell, and
if $M_{FDD} \le 4$, the UE generates acknowledgement information for $\min(W_{DAI}^{UL}, M_{TDD})$ TTIs for the PCell and for $\min(W_{DAI}^{UL}, M_{FDD})$ TTIs for the SCell;
if the PCell TDD UL-DL configuration is not TDD UL-DL configuration 5 and if $M_{FDD} > 4$, the UE generates acknowledgement information for $\min(W_{DAI}^{UL}, M_{TDD})$ TTIs for the PCell and for $\min(W_{DAI}^{UL} + 4\lceil(U-W_{DAI}^{UL})/4\rceil, M_{FDD})$ TTIs for the SCell, wherein the UE detects U DCI formats scheduling PDSCH in the SCell; and
if the PCell TDD UL-DL configuration is TDD UL-DL configuration 5, the UE generates acknowledgement information for $\min(W_{DAI}^{UL} + 4\lceil(U-W_{DAI}^{UL})/4\rceil, M_{TDD})$ TTIs for the PCell and for $\min(W_{DAI}^{UL} + 4\lceil(U-W_{DAI}^{UL})/4\rceil, M_{FDD})$ TTIs for the SCell, wherein U is the larger number between a number of DCI formats scheduling PDSCH or SPS PDSCH release in the PCell and a number of DCI formats scheduling PDSCH in the SCell that the UE detects; and transmitting, by the UE, the acknowledgement information in the PUSCH in the UL TTI.

12. A base station configured to communicate with a User Equipment (UE) through a Primary Cell (PCell) using either Frequency Division Duplexing (FDD) or Time Division Duplexing (TDD), the base station comprising:
   a transmitter configured to transmit, to the UE:
      configuration information for communication with a Secondary Cell (SCell), wherein if the PCell uses FDD the SCell uses TDD, and if the PCell uses TDD the SCell uses FDD,
      signaling indicating a TDD UpLink-DownLink (UL-DL) configuration for the cell using TDD, wherein a TDD UL-DL configuration is defined over a time period of ten Transmission Time Intervals (TTIs) that comprise DL TTIs where a communication direction is from the base station to the UE, UL TTIs where a communication direction is from the UE to the base station, and special TTIs where a communication direction can be both from the base station to the UE and from the UE to the base station, and wherein each TTI of the ten TTIs has a unique time domain index, and
      one or more Physical DL Control CHannels (PDCCHs) conveying respective one or more DL control information (DCI) formats, wherein each of the one or more DCI formats schedules to the UE a Physical DL Shared CHannel (PDSCH) transmission or a Semi-Persistently Scheduled (SPS) PDSCH release in the PCell or a PDSCH transmission in the SCell;
   a processing circuitry configured to determine an UL TTI for a reception of acknowledgement information from the UE; and
   a receiver configured to receive from the UE acknowledgement information in an UL TTI in the PCell wherein:
      if the PCell uses FDD, the acknowledgement information is in response to one reception, by the UE, of PDSCH or SPS PDSCH release in the PCell or in response to one reception, by the UE, of PDSCH in the SCell, in only one TTI, wherein;
      if the only one TTI is not an UL TTI in the SCell, the acknowledgement information is in response to a reception of a PDSCH or SPS PDSCH release in the PCell and in a response to a reception of a PDSCH in the SCell, including no reception in either the PCell or in the SCell; and
      if the only one TTI is an UL TTI in the SCell, the acknowledgement information is in response only to a reception of a PDSCH or SPS PDSCH release in the PCell; and
      if the PCell uses TDD, the acknowledgement information is in response to at least one reception of a PDSCH or SPS PDSCH release in one of $M_{TDD}$ TTIs in the PCell or of a PDSCH in one of $M_{FDD}$ TTIs in the SCell, wherein $M_{TDD}$ or $M_{FDD}$ is a number of TTIs in the PCell or the SCell, respectively, for which acknowledgement information is transmitted in the UL TTI and $M_{TDD}$ is smaller than or equal to $M_{FDD}$.

13. The base station of claim 12, wherein the PCell uses FDD and wherein at least one DCI format, from the one or more DCI formats, schedules a PDSCH transmission to the UE in the SCell and includes an Acknowledgement Resource Offset (ARO) field comprising of 2 binary elements having a mapping to numeric values that is determined as in a third table for m=0, wherein the third comprises

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 | wherein $N_{ECCE,q,n-k_{i1}}$ is equal to a number of control channel elements (CCEs) in a set q of DL resources configured for transmission to the UE in DL TTI $n-k_{i1}$.

14. The base station of claim 12, wherein the PCell uses TDD and wherein at least one DCI format, from the one or more DCI formats, schedules a PDSCH transmission to the UE in the SCell in TTI m, wherein a maximum number of TTIs for PDSCH transmissions in the SCell for which the UE transmits acknowledgment information in the UL TTI is $M_{FDD}$ and $0 \leq m < M_{FDD}$, and includes an Acknowledgement Resource Offset (ARO) field comprising of 2 binary elements having a mapping to numeric values that is determined by the value of m as in a third table for $M=M_{FDD}$, wherein the third table comprises

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 | wherein $N_{ECCE,q,n-k_{i1}}$ is equal to a number of control channel elements (CCEs) in a set q of DL resources configured for transmission to the UE in DL TTI $n-k_{i1}$.

15. A User Equipment (UE) configured to communicate with a base station through a Primary Cell (PCell) using either Frequency Division Duplexing (FDD) or Time Division Duplexing (TDD), comprising:
   a receiver, configured to receive, from the base station:
      configuration information for communication with a Secondary Cell (SCell), wherein if the PCell uses FDD the SCell uses TDD, and if the PCell uses TDD the SCell uses FDD,
      signaling indicating a TDD UpLink-DownLink (UL-DL) configuration for the cell using TDD, wherein a TDD UL-DL configuration is defined over a time period of ten Transmission Time Intervals (TTIs) that comprise DL TTIs where a communication direction is from the base station to the UE, UL TTIs where a communication direction is from the UE to the base station, and special TTIs where a communication direction can be both from the base station to the UE and from the UE to the base station, and wherein each TTI of the ten TTIs has a unique time domain index, and one or more Physical DL Control CHannels (PDCCHs) conveying respective one or more DL control information (DCI) formats, wherein each of the one or more DCI formats schedules a Physical DL Shared CHannel (PDSCH) or a Semi-Persistently Scheduled (SPS) PDSCH release in the PCell or a PDSCH in the SCell;

a processing circuitry configured to determine an UL TTI for a transmission of acknowledgement information to the base station; and a transmitter configured to transmit to the base station, in response to the reception of the configuration information, the signaling, and the one or more DCI formats, acknowledgement information wherein:

if the PCell uses FDD, the acknowledgement information is in response to one reception of PDSCH or SPS PDSCH release in the PCell or in response to one reception of PDSCH in the SCell, in only one TTI, wherein;

if the only one TTI is not an UL TTI in the SCell, the acknowledgement information is in response to a reception of a PDSCH or SPS PDSCH release in the PCell and in a response to a reception of a PDSCH in the SCell, including no reception in either the PCell or in the SCell; and if the only one TTI is an UL TTI in the SCell, the acknowledgement information is in response only to a reception of a PDSCH or SPS PDSCH release in the PCell; and if the PCell uses TDD, the acknowledgement information is in response to at least one reception of a PDSCH or SPS PDSCH release in one of $M_{TDD}$ TTIs in the PCell or of a PDSCH in one of $M_{FDD}$ TTIs in the SCell, wherein $M_{TDD}$ or $M_{FDD}$ is a number of TTIs in the PCell or the SCell, respectively, for which acknowledgement information is transmitted in the UL TTI and $M_{TDD}$ is smaller than or equal to $M_{FDD}$.

16. The UE of claim 15, wherein the PCell uses FDD and wherein at least one DCI format, from the one or more DCI formats, schedules a PDSCH transmission to the UE in the SCell and includes an Acknowledgement Resource Offset (ARO) field comprising of 2 binary elements having a mapping to numeric values that is determined as in a third table for m=0, wherein the third table comprises

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 | wherein $N_{ECCE,q,n-k_{i1}}$ is equal to a number of control channel elements (CCEs) in a set q of DL resources configured for transmission to the UE in DL TTI $n-k_{i1}$.

17. The UE of claim 15, wherein the PCell uses TDD and wherein at least one DCI format, from the one or more DCI formats, schedules a PDSCH transmission to the UE in the SCell in TTI m, wherein a maximum number of TTIs for PDSCH transmissions in the SCell for which the UE transmits acknowledgment information in the UL TTI is $M_{FDD}$ and $0 \le m < M_{FDD}$, and includes an Acknowledgement Resource Offset (ARO) field comprising of 2 binary elements having a mapping to numeric values that is determined by the value of m as in a third table for $M = M_{FDD}$, wherein the third table comprises

| ARO Field in DL DCI format | $\Delta_{ARO}$, m = 0 | $\Delta_{ARO}$, 0 < m < M |
|---|---|---|
| 0 | 0 | 0 |
| 1 | −2 | $-\sum_{i1=0}^{m-1} N_{ECCE,q,n-k_{i1}} - 2$ |
| 2 | −1 | $-\sum_{i1=m-\lceil m/3 \rceil}^{m-1} N_{ECCE,q,n-k_{i1}} - 1$ |
| 3 | 2 | 2 | wherein $N_{ECCE,q,n-k_{i1}}$ is equal to a number of control channel elements (CCEs) in a set q of DL resources configured for transmission to the UE in DL TTI $n-k_{i1}$.

18. A base station configured to communicate with a User Equipment (UE) through a Primary Cell (PCell) using a Time Division Duplexing (TDD) UpLink-DownLink (UL-DL) configuration, comprising:

a transmitter; and a processor configured to control the transmitter to transmit, to the UE:

configuration information for communication with a Secondary Cell (SCell) using Frequency Division Duplexing (FDD); and one or more Physical DL Control CHannel (PDCCH) conveying a respective one or more DL control information (DCI) formats scheduling to the UE respective transmissions of one or more Physical DL Shared CHannels (PDSCHs) or a Semi-Persistently Scheduled (SPS) PDSCH release, wherein each of the one or more DCI formats includes a DL Hybrid Acknowledgement Repeat reQuest (HARQ) field comprising of 4 binary elements indicating a DL HARQ process and wherein, if the PCell uses TDD UL-DL configuration 5 from Table 1, a DL HARQ process for the SCell is restricted to be one of 16 DL HARQ processes, from a maximum of 17 DL HARQ processes, wherein Table 1 comprises

| TDD UL-DL Con-figuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D. |

19. The base station of claim 18, wherein the processor is further configured to control transmitter to transmit, to the UE, a PDCCH conveying a DCI format scheduling a Physical UL Shared CHannel (PUSCH) transmission from the UE, wherein
  if the DCI format schedules a PUSCH transmission in the PCell and the PCell uses TDD UL-DL configuration 0 from Table 1, the DCI format includes an index field comprising of 2 binary elements indicating one or two UL Transmission Time Intervals (TTIs) for the PUSCH transmission;
  if the DCI format schedules a PUSCH transmission in the PCell and the PCell uses a TDD UL-DL configuration from Table 1, other than TDD UL-DL configuration 0, the DCI format includes a Downlink Assignment Index (DAI) field comprising 2 binary elements indicating a number of DL TTIs for which, in response to transmissions of respective PDSCH or SPS PDSCH release from the base station, acknowledgement information is included in the PUSCH from the UE; and
  if the DCI format schedules a PUSCH transmission in the SCell, the DCI format includes the DAI field and does not include the index field regardless of the TDD UL-DL configuration used in the PCell; and
  a receiver configured to receive from the UE the PUSCH in an UL TTI when the DCI format includes a DAI field, or in one UL TTI or two UL TTIs, depending on a value of the index field, when the DCI format includes the index field.

20. A User Equipment (UE) configured to communicate with a base station through a Primary Cell (PCell) using a Time Division Duplexing (TDD) UpLink-DownLink (UL-DL) configuration, comprising:
  a receiver; and
  a processor configured to control the receiver to receive, from the base station:
    configuration information for communication with a Secondary Cell (SCell) using Frequency Division Duplexing (FDD); and
    one or more Physical DL Control CHannel (PDCCH) conveying a respective one or more DL control information (DCI) formats scheduling respective receptions of one or more Physical DL Shared CHannels (PDSCHs) or a Semi-Persistently Scheduled (SPS) PDSCH release, wherein each of the one or more DCI formats includes a DL Hybrid Acknowledgement Repeat reQuest (HARQ) field comprising of 4 binary elements indicating a DL HARQ process and wherein, if the PCell uses TDD UL-DL configuration 5 from Table 1, a DL HARQ process for the SCell is restricted to be one of 16 DL HARQ processes, from a maximum of 17 DL HARQ processes, wherein Table 1 comprises

| TDD UL-DL Configuration | DL-to-UL Switch-point periodicity | TTI number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D. |

21. The UE of claim 20, wherein the processor is configured to control the receiver to receive a PDCCH conveying a DCI format scheduling a Physical UL Shared CHannel (PUSCH) transmission, wherein
  if the DCI format schedules a PUSCH transmission in the PCell and the PCell uses TDD UL-DL configuration 0 from Table 1, the DCI format includes an index field comprising of 2 binary elements indicating one or two UL Transmission Time Intervals (TTIs) for the PUSCH transmission;
  if the DCI format schedules a PUSCH transmission in the PCell and the PCell uses a TDD UL-DL configuration from the Table 1, other than TDD UL-DL configuration 0, the DCI format includes a Downlink Assignment Index (DAI) field comprising of 2 binary elements indicating a number of DL TTIs for which, in response to transmissions of respective PDSCH or SPS PDSCH release from the base station, the UE shall include acknowledgement information in the PUSCH; and
  if the DCI format schedules a PUSCH transmission in the SCell, the DCI format includes the DAI field and does not include the index field regardless of the TDD UL-DL configuration used in the PCell; and
  a transmitter configured to transmit the PUSCH in an UL TTI when the DCI format includes a DAI field, or in one UL TTI or two UL TTIs, depending on a value of the index field, when the DCI format includes the index field.

* * * * *